United States Patent
Voda et al.

(10) Patent No.: US 7,245,043 B2
(45) Date of Patent: *Jul. 17, 2007

(54) DEVICE SYSTEM AND METHOD FOR PREVENTING VEHICLE THEFT

(75) Inventors: Benny Voda, Tel Aviv (IL); David Makover, Tel Aviv (IL)

(73) Assignee: StarTech Automotive Anti Theft Systems Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/548,095

(22) PCT Filed: Mar. 3, 2004

(86) PCT No.: PCT/IL2004/000209

§ 371 (c)(1),
(2), (4) Date: Sep. 6, 2005

(87) PCT Pub. No.: WO2004/078522

PCT Pub. Date: Sep. 16, 2004

(65) Prior Publication Data

US 2006/0170286 A1    Aug. 3, 2006

(51) Int. Cl.
*B60R 25/00* (2006.01)
(52) U.S. Cl. .................................... 307/10.2
(58) Field of Classification Search ............ 307/10.2
See application file for complete search history.

(56) References Cited

U.S. PATENT DOCUMENTS

| | | |
|---|---|---|
| 4,209,709 A | 6/1980 | Betton |
| 4,288,778 A | 9/1981 | Zucker |
| 4,533,016 A | 8/1985 | Betton |
| 4,589,514 A | 5/1986 | Wilson et al. |
| 4,733,638 A | 3/1988 | Anderson |
| 5,138,986 A | 8/1992 | Aguilar |
| 5,533,589 A | 7/1996 | Critzer |
| 5,548,164 A | 8/1996 | Hillard et al. |
| 5,564,376 A | 10/1996 | Labelle et al. |
| 5,808,543 A | 9/1998 | Peyre |
| 5,927,240 A * | 7/1999 | Maxon .................... 123/179.3 |
| 6,069,411 A | 5/2000 | Charron |
| 6,116,201 A | 9/2000 | LaBelle |
| 6,170,595 B1 | 1/2001 | Denz et al. |
| 6,227,158 B1 | 5/2001 | LaBelle |
| 6,351,209 B1 | 2/2002 | Snyder |
| 2004/0041689 A1 | 3/2004 | DeBono |

FOREIGN PATENT DOCUMENTS

| | | |
|---|---|---|
| DE | 4309342 | 9/1994 |
| FR | 2764570 | 6/1997 |
| FR | 2769562 | 4/1999 |

* cited by examiner

Primary Examiner—Robert L. Deberadinis

(57) ABSTRACT

Apparatus for securing a motor vehicle against theft uses a vehicle control device connected by a signaling link to a first control node of a vehicle module essential to mobilization of the vehicle, the essential module further having a power node connected to a power supply source. The apparatus comprises: an enable/disable control for conditionally disabling signaling along the signaling link, a user interface code input device communicating with the enable/disable control via a secure command link, and an armored encapsulation encapsulating the disable control and the control node and physically configured to render inoperable any of the disable control, the signaling link and the control node upon being tampered with.

75 Claims, 11 Drawing Sheets

DEVICE SYSTEM AND METHOD FOR PREVENTING VEHICLE THEFT

RELATED PATENT APPLICATION

This application is a National Phase Application of PCT/IL2004/000209 having International Filing Date of 3 Mar. 2004, which claims the benefit of U.S. provisional patent application Ser. No. 10/376,744 filed 3 Mar. 2003. The contents of the above Application are all incorporated herein by reference.

FIELD AND BACKGROUND OF THE INVENTION

The present invention relates to prevention of vehicle theft and, more particularly, to the prevention of vehicle theft using a combination of electronic or mechanical control and physical armored encapsulation.

Vehicle theft is a well-known and widespread crime, causing severe financial damage and affecting the public sense of well-being and morale.

Numerous motor vehicle anti-theft devices are known in the art. These include, inter alia, mechanical locks, electronic alarm systems, electronic engine immobilizers, automatic vehicle location systems and devices for disabling the fuel supply to the engine.

Conventional alarm type theft preventing devices typically comprise a control unit, a loud speaker, a plurality of sensors and a remote controller. The control unit and the loud speaker are installed in the inside of the car, while the remote controller is used for transmitting a control signal to turn the control unit on or off. When the control unit is turned on, it is capable of triggering the loud speaker to give off an alarm signal to frighten the burglar and alert passers-by. Nowadays, it is appreciated that alarm signals themselves are ignored by passers by and thus do not in themselves deter the thief. Thus vehicles are typically further equipped with some kind of engine immobilizer. In one kind of immobilizer the power source of the starter is shut off whilst the legal owner has left the vehicle Such an immobilizer is only partly successful as often the thief is able to start the vehicle before the immobilizer has armed or he is able to disable the alarm by electrically bypassing it Alternatively, the thief can disable or reduce the operation of the alarm loud speaker by inserting a foamy material thereto. Other known systems choke off the fuel supply to the engine.

A common drawback for many of the anti-theft systems is the ability of the thief to access the anti-theft system thereby to disable it. Some systems offer an armored enclosure to serve as defense against violent attacks of the switching device, and against attempts to tamper with the security system.

U.S. Pat. No. 4,288,778 to Zucker teaches a method of using digital electronic anti-theft system integrally formed with a vehicle component.

U.S. Pat. No. 4,209,709 to Betton discloses an electronic ignition system in which electronic circuitry is located in an auxiliary metallic housing which is configured to surround both the solenoid and starter motor of the vehicle. The electrical interconnection between the circuitry and the solenoid are accomplished within the protection of the auxiliary housing. U.S. Pat. No. 4,533,016 to Betton discloses an electronic circuit enclosed within a solenoid housing with means for inhibiting actuation of the solenoid in the absence of entry of a predetermined code from the ignition switch of the vehicle.

French patent FR2764570 to Duval discloses a keypad controlling a starter relay voltage supply, where the starter motor may further be locked. Anti-theft screws with security lugs are used to avoid dismantling of the starter.

U.S. Pat. No. 5,564,376 to Labelle, discloses a housing, which is connectable to the starter motor casing, and serves as enclosure to a control circuit. U.S. Pat. No. 6,227,158 to Labelle discloses a similar arrangement for the starter solenoid; U.S. Pat. No. 6,116,201 and WO0071395 to Labelle teach the use of the starter solenoid housing itself as enclosure for an integrated security chip.

Also of prior art of interest are devices which are used to control the security system. These include, U.S. Pat. No. 4,733,638 which discloses a hand-held transmitter, French Patent No. FR2769562 which discloses the use of an RF signal, U.S. Pat. No. 6,069,411 which discloses the use the Electronic Serial Number of a cellular phone as an ID code, U.S. Pat. No. 5,808,543 which discloses such a system dependent on a radio frequency identification device badge usually used in vehicle key systems, and U.S. Pat. No. 5,704,008 which teaches a voice or password recognition control of the starter solenoid.

Despite the use of the above devices, thieves nevertheless find ways and means of overcoming (e.g., by bypassing) the various protection devices. Mechanical locking devices are broken and by-passed, cut-off valves are circumvented or disabled, electronic engine immobilizers are hot-wired and even sophisticated anti-theft systems are overcome by key-theft or lock picking. A recently observed theft method involves a replacement kit for the vehicle Engine Control Unit (ECU), which is used to bypass the whole security system. A thief equipped with a pre-prepared replacement kit, a key and a key decoder, can fit the unit within minutes and drive away with the vehicle.

It is thus appreciated that the non-accessibility of the anti-theft system to the thief is of utmost importance. Furthermore, it is important that such non-accessible system would be protected against bypassing. Many known physically armored devices are aimed at protecting the vehicle via starter disabling methods. Such devices may be categorized into two groups, built-in control devices, destined to be integrated within the solenoid housing, and add-on armored control devices, destined to be mounted over the solenoid housing. Built-in control devices require re-design of the starter solenoid for new vehicles, or the exchange of a solenoid or solenoid-starter assembly in pre-existing vehicles.

Add-on armored control devices according to prior art require very large protective covers that may interfere with engine compartment serviceability and with proper ventilation of the engine bay. In addition, installation of presently known add-on armored control devices is very complicated, if at all possible, in existing vehicles. Furthermore, prior art built-in or add-on control devices may be unable to withstand the harsh environmental conditions typical of vehicle engine compartments.

Examples of such protective covers are given in U.S. Pat. Nos. 6,351,209 and 5,548,164. These examples suffer from some or all of the disadvantages listed above they further are very complex to manufacture, require considerable installation efforts and require a plurality of models to fit most vehicle types.

There is thus a widely recognized need for, and it would be highly advantageous to have, a system for preventing vehicle theft devoid of the above limitations.

SUMMARY OF THE INVENTION

According to a first aspect of the present invention there is provided apparatus for securing a motor vehicle against theft, the motor vehicle having a starting switch connected by a signal wire to a control node of a starter unit, the starter unit having a power node connected to a starter motor, and a power node connected to a power supply source, the apparatus comprising:

an enable/disable control for conditionally disabling signaling along said signal wire, and an armored encapsulation encapsulating said disable control and said first control node and physically configured to render inoperable at least one of said enable/disable control, said signal wire and said control node upon being tampered with.

In the following the component selected from the enable/disable control, the signal wire and the control node, which is rendered inoperable, is referred to also as the essential component.

A control apparatus comprises a switching device such as an electro mechanical relay or a solid-state device such as a field effect transistor (FET) or similar signal or power switching devices, and a logic device such as an electronic circuit governing the switching device. The control apparatus toggles a connection between an energy source or a signal source and a module essential to mobilizing the vehicle so as to toggle the state of the signal wire from a transmissive state to a non-transmissive state or vice-versa.

Preferably, the size of the at least one armored encapsulation is selected to substantially encapsulate the control apparatus and the signal wire connecting the control apparatus to the essential module.

The type of signal communication with the control apparatus may be selected from the group consisting of a wireless electrical communication, a wired electrical communication, and an optical link.

A module essential to mobilize the vehicle, and whose disablement is used to provide the security protection may be any of a starter, a solenoid of a starter, an integrated starter-alternator device, a Dynamo-Starter device, a starter-generator, a power-supply unit, a hand brake, a gearshift selector and an electric part of a hybrid-powered vehicle. In the following, such a module is referred to also as the essential module.

The locking device itself is preferably designed and constructed to perform electrical switching so as that the positioning of the locking device comprises selecting between connecting or disconnecting or bypassing the electrical switch through the locking device.

The control apparatus may be designed, constructed or positioned so as to selectively activate an electro-mechanical actuator control device that mechanically limits the motion of the solenoid internal plunger, thereby to indirectly prevent a starter motor of the vehicle from rotating an engine of the vehicle.

The control apparatus may be designed, constructed or positioned so as to selectively activate an electromechanical actuator control device to mechanically limit the motion of the starter internal mechanical coupler, thereby preventing a starter motor of the vehicle from engaging and thus rotating an engine shaft of the vehicle.

The control apparatus may be designed, constructed or positioned so as to selectively activate an electromechanical actuator control device to mechanically limit the motion of the starter solenoid actuation lever. The lever is normally used to actuate the engagement of the shaft of the starter motor to the vehicle engine shaft flywheel, thus the limiting of the motion of the solenoid lever prevents a starter motor of the vehicle from engaging and thus rotating an engine shaft of the vehicle.

According to still a further aspect of the present invention the system comprises a volume generating mechanism being geometrically compatible with at least one pre-existing component of the at least one essential module and at least one part of the armored encapsulation. The said mechanism generates a volume surrounding at least a part of the essential module, said volume shape and size being defined in the at least one armored encapsulation and being sufficient for encapsulating the control apparatus while forming a substantially compact assembly.

According to still further features in the described preferred embodiments the volume generating mechanism comprises at least one elongator positioned between the essential module and the at least one armored encapsulation so as to increase a volume for being sufficient for encapsulating the control apparatus.

According to further features in the described preferred embodiments the volume generating mechanism comprises at least one elongator forming an extension to one power stud of an electric essential module such as the starter solenoid.

According to still further features in the described preferred embodiments the at least one electric power stud elongator is made of a combination of a conductive material and an insulating material, designed and constructed for preventing electric contact between the at least one armored encapsulation and at least one other part of the system selected from the control apparatus or at least one electric power stud.

Typically, the control apparatus comprises an enable/disable control, which may be a mechanical switch such as an electro mechanical relay or a solid-state device such as a field effect transistor (FET) or similar signal or power switching devices, and a logic device such as an electronic circuit governing the switching device. The control apparatus toggles a connection between an energy source or a signal source and the said essential module so as to toggle the state of the signal wire from a transmissive state to a non-transmissive state or vice-versa. Alternatively the control device uses other methods of enabling or disabling signaling along the signal wire, either directly or indirectly.

According to still further features in the described preferred embodiments a body of the at least one armored encapsulation is selected from the group consisting of a shell body and a solid body.

According to further features in the described preferred embodiments the size of the at least one armored encapsulation is selected to substantially encapsulate the control apparatus and the signal wire connecting the control apparatus to the essential module.

According to still further features in the described preferred embodiments the at least one armored encapsulation is mounted to the essential module by being connected to at least one pre-existing integral component of it.

According to still further features in the described preferred embodiments the at least one pre-existing integral component of the at least one essential module is a mounting nut or an assembly nut.

According to still further features in the described preferred embodiments the at least one armored encapsulation comprises a first part, and a second part being geometrically compatible with the first part, the first and the second parts may be rotated to a plurality of angles, such as that the encapsulating comprises rotating the first part relative to the second part so as to match orientation of the at least one essential module.

According to still further features in the described preferred embodiments the at least one armored encapsulation comprises a plurality of positioning pairs, such as a pin-groove pair, each corresponding to one angle of the plurality of angles.

According to still further features in the described preferred embodiments the system further comprises a user interface device being designed and constructed for activating and deactivating the control apparatus via signal communication with the control apparatus, selected from the group consisting of a wireless electrical communication, a wired electrical communication, and an optical link.

According to still further features in the described preferred embodiments the user interface device comprises recognition circuitry for recognizing a user prior to the activating and deactivating.

According to still further features in the described preferred embodiments the recognition circuitry is selected from the group consisting of keyed-in password recognition circuitry, spoken password recognition circuitry, biometric voice recognition circuitry, biometric fingerprint recognition circuitry, biometric bone structure recognition circuitry and biometric iris-patterns recognition circuitry.

According to another aspect of the present invention there is provided a method of installing a theft-preventing system within a vehicle, the method comprising: providing a control apparatus and positioning it so as to control operation of at least one module being essential to mobilization of the vehicle, and encapsulating the control apparatus and at least a portion of the at least one essential module using at least one armored encapsulation so as to prevent accessing the control apparatus without substantially damaging the at least one armored encapsulation and the at least one essential module, thereby preventing unauthorized mobilization of the vehicle.

According to further features in the described preferred embodiments the encapsulating is done so as to encapsulate essentially the control apparatus and the signal wire connecting the control apparatus to the essential module.

According to still further features in the described preferred embodiments the encapsulating comprises independently integrating the control apparatus and the at least a portion of the at least one essential module in the solid body of the at least one armored encapsulation.

According to still further features in the described preferred embodiments the method further comprises providing a user interface device electrically communicating with the control apparatus, and operating the user interface device so as to activate or deactivate the control apparatus.

According to still further features in the described preferred embodiments the method further comprises fastening the at least one armored encapsulation to a body of the vehicle using at least one anti-vandal security nut, the at least one security nut being designed and constructed for preventing a removal of the at least one armored encapsulation.

According to still further features in the described preferred embodiments the method further comprises allowing bypassing the control module by performing a predetermined procedure.

According to still further features in the described preferred embodiments the method further comprises positioning a heat isolating interface between the at least one armored encapsulation and an engine or an engine bay of the vehicle, for preventing heat transfer from the engine to the at least one armored encapsulation.

According to still further features in the described preferred embodiments the at least one essential module is selected from the group consisting of a starter, a solenoid of a starter, an integrated starter-alternator device, a Dynamo-Starter device, a starter-generator, a power-supply unit, a hand brake, a gearshift selector and an electric part of a hybrid-powered vehicle.

According to preferred embodiments of the present invention the at least one essential module is the solenoid governing the starter motor of the engine of the vehicle, and the control apparatus is designed and constructed and positioned so as to control power or data signals transmitted through a signal conducting wire connecting an ignition switch of the vehicle and a control node of the solenoid of the starter.

According to further features in the described preferred embodiments the armored encapsulation that protects the control apparatus and the solenoid control node is being attached to any other pre-existing integral part of the solenoid such as to a power node stud of the solenoid or to a mounting nut or to an assembly nut so that in the event of an attempt to interfere with the encapsulation, a solenoid node is rendered useless.

According to still further features in the described preferred embodiments the system further comprises a self-destructing assembly positioned within the at least one armored encapsulation, the self-destructing assembly being designed and constructed so that if the at least one armored encapsulation is at least partially damaged, the self-destructing assembly disintegrates, hence providing the damaging of the at least one essential module.

According to still further features in the described preferred embodiments the armored encapsulation being at least partially damaged is selected from the group consisting of the armored encapsulation being at least partially bended, being at least partially twisted, being at least partially strained, being at least partially pried open and being at least partially broken.

According to still further features in the described preferred embodiments the self-destructing assembly comprises a conducting foil.

According to still further features in the described preferred embodiments at least one anti-vandal security nut comprises a first part, a second part and a third part, the second part being positioned between the first and the third part and comprises a detachable material so that if a shear force applied onto the first part exceeds a predetermined maximal value, the first part detaches from the third part.

According to still further features in the described preferred embodiments a shape of the third part is characterized by smooth edges designed so as to prevent opening of the third part, thereby to prevent removal of the at least one armored encapsulation.

According to still further features in the described preferred embodiments the connecting the at least one security nut is by applying a torque that induces a shear force being larger than the predetermined maximal value, so as to detach the first part from the third part.

According to still further features in the described preferred embodiments the first and the second parts have a sufficiently large combined longitudinal dimension so as to encapsulate the at least one elongator.

According to still further features in the described preferred embodiments the system comprises at least one secured bypassing device enabling to circumvent the control apparatus by a predetermined procedure.

According to still further features in the described preferred embodiments the secured bypass device is at least one locking device allowing a removal of at least a portion of the at least one armored encapsulation by a predetermined procedure, without causing damage to the at least one armored encapsulation.

According to still further features in the described preferred embodiments the bypassing device comprises an electrical switch connected to the at least one essential module so that if the predetermined procedure is executed, the control apparatus is bypassed.

According to still further features in the described preferred embodiments the locking device itself is designed and constructed to perform electrical switching so as that the positioning of the at least one locking device comprises bypassing the electrical switch through the locking device.

According to still another aspect of the present invention there is provided a solenoid system for controlling supply of electrical current to a starter of a vehicle, the solenoid system being encapsulated by an armored encapsulation and having a solenoid and a system for preventing theft of the vehicle, the system comprising a control apparatus for selectively controlling the motion of an internal plunger, the method comprising selectively preventing motion of an internal plunger of the solenoid, thereby preventing initial ignition of the vehicle, wherein the controlling the motion is selected from the group consisting of mechanically controlling and electrically controlling.

According to further features in the described preferred embodiments, the control apparatus comprises an electrical switch operable to selectively control electrical power supply or data signals transmitted to the solenoid internal plunger through a wire winding the internal plunger in such a manner that the motion of the internal plunger is allowed, or disabled.

According to still further features in the described preferred embodiments the control apparatus is operable to selectively limit a motion of a mechanical shift lever solenoid output being operatively associated with the mechanical engagement of the starter motor of the vehicle, thereby to indirectly prevent the starter motor from rotating an engine of the vehicle.

According to still further features in the described preferred embodiments the control apparatus is designed, constructed and positioned so as to selectively activate an electromechanical actuator control device selectively operable to mechanically limit the motion of the solenoid internal plunger, thereby to indirectly prevent a starter motor of the vehicle from rotating an engine of the vehicle, According to still further features in the described preferred embodiments the bypassing the control apparatus is by disabling the mechanical actuator so as to allow the motion of the internal plunger.

According to still further features in the described preferred embodiments the control apparatus controls a blocking mechanism positioned opposite an elongation rod which is connected to the solenoid internal plunger, the mechanism being designed and constructed so as to selectively limit the motion of the internal plunger.

According to still further features in the described preferred embodiments the bypassing the control apparatus is by disabling the blocking mechanism so as to allow the motion of the internal plunger with the elongation rod.

According to still further features in the described preferred embodiments the selectively preventing the internal plunger motion comprises irreparably disabling the motion, if an attempt is made to open an armored encapsulation of the solenoid.

According to still a further aspect of the present invention there is provided a power-supply device for supplying power to a vehicle and preventing theft thereof, the power-supply unit comprising a plurality of electrolytic cells and a short circuit controlled by a control apparatus switching device, the short circuit being connected so as to bypass at least one of the plurality of electrolytic cells, thereby to control a value of voltage supplied by the power-supply unit.

According to further features in preferred embodiments of the invention described below, the power-supply device further comprises a self-destructing assembly being designed and constructed so that if the power-supply device is at least partially damaged, the self-destructing assembly disintegrates, hence disabling at least one of the plurality of electrolytic cells.

According to still further features in the described preferred embodiments the self-destructing assembly comprises a conducting foil and at least one compatible connector connected to the conducting foil.

According to still further features in the described preferred embodiments the at least one armored encapsulation is designed and constructed so as to encapsulate the positive terminal of the power-supply unit, the power input terminal of a starter solenoid of the vehicle and the wire connecting them.

According to still further features in the described preferred embodiments the at least one armored encapsulation is designed and constructed so as to prevent heating of the control apparatus by applying at least one of the following means in the construction of the armored encapsulation: using a construction material characterized by low heat capacity, using at least one reflective layer capable of reflecting heat radiation there from, integrating at least two layers separated by a medium capable of preventing heat convection, being sufficiently small so as to allow ventilation within the engine bay.

According to still further features in the de scribed preferred embodiments the control apparatus is designed and adapted to be locatable within an engine bay of the vehicle by applying at least one of the following means in the construction: using at least one electronic circuit assembly being formed in a dielectric material selected to withstand any one of high temperature, moisture, electrical sparks, mechanical vibrations and chemical vapors, being sufficiently small so as to allow ventilation within the engine bay, using components that are heat resistant.

According to further features in preferred embodiments of the invention described below, the system further comprises a communication device, being able to communicate with a remote control center, The communications device may optionally be able to receive responses from the remote control center thereby to apply activation or deactivation commands to the control apparatus.

According to still further features in the described preferred embodiments the method further comprises positioning the communication device within the at least one armored encapsulation, wherein the communication device being operable to transmit alert signals to the remote control center if the at least one armored encapsulation is at least partially damaged.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
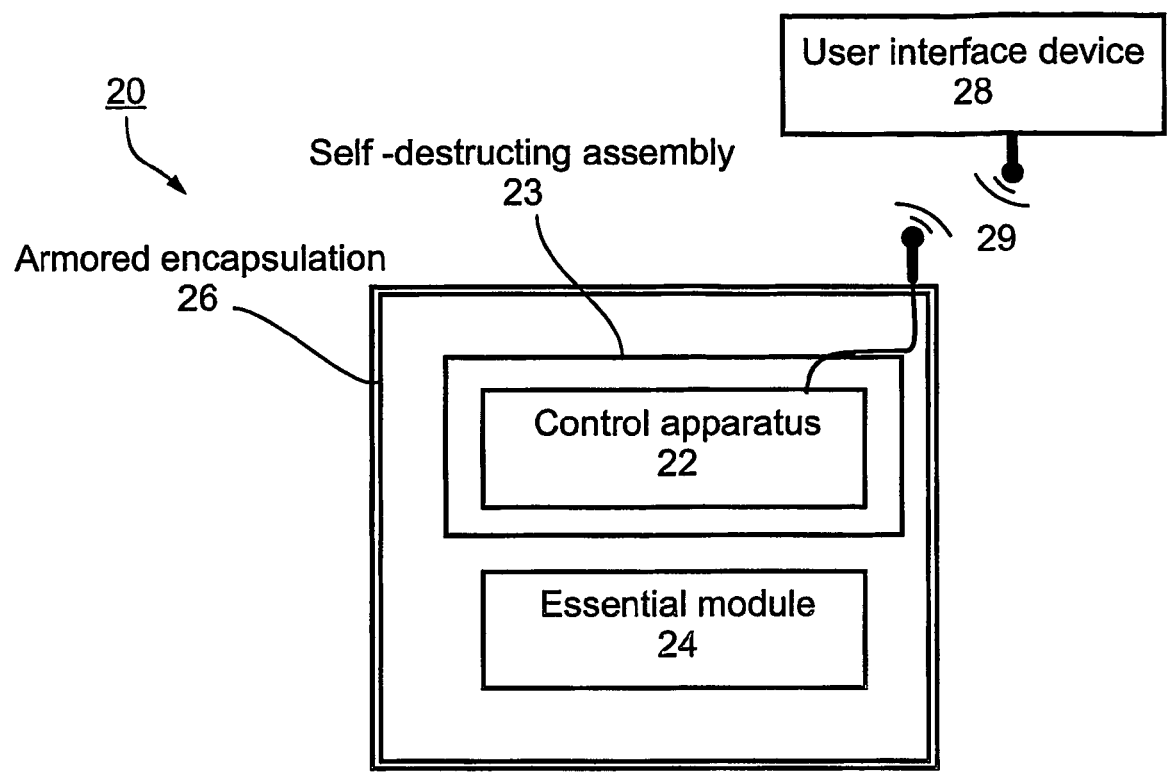
FIG. 1 is a schematic illustration of a system for preventing theft of a vehicle, according to a preferred embodiment of the present invention.

The present embodiments are of a system for preventing theft of a vehicle, which can be installed in various locations within the vehicle. Specifically, the present embodiments are of a system which combines electronic or mechanical control with a physical armored encapsulation. The present embodiments are further of a method of installing the system and a method of preventing theft of the vehicle. The present embodiments are still further of a starter system, a solenoid system and a power-supply device, incorporating the principles of the system.

The principles and operation of a system for preventing theft of a vehicle according to the present embodiments may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to one aspect of the present invention there is provided a system for preventing theft of a vehicle, the vehicle having at least one essential module. The essential module can be any module which is essential to mobilization of the vehicle, e.g., a starter, a power-supply unit, a hand brake, an integrated starter-alternator device, a Dynamo-Starter device (also known as dynostart), a gearshift selector, an electric part of a hybrid-powered vehicle, and the like.

Referring now to the drawings, FIG. 1 is a schematic illustration of a system according to a first preferred embodiment of the present invention. System 20 comprises a control apparatus 22 for controlling operation of essential module 24, and both the control apparatus and the essential module are housed within an armored encapsulation 26. One or more of the shape, configuration, material, size and/or location of armored encapsulation 26 within the vehicle is designed so as to prevent accessing control apparatus 22 without substantially damaging armored encapsulation 26. The armored encapsulation is designed so that if it is damaged, so is the essential module 24, thereby preventing the mobilization of the vehicle. A number of possibilities for achieving such a result are described in greater detail hereinbelow. According to a preferred embodiment of the present invention armored encapsulation 26 is designed to be located within an engine bay of the vehicle. Furthermore, armored encapsulation 26 is preferably designed to be sufficiently small so as to allow ventilation within the engine bay.

According to preferred embodiments of the present invention armored encapsulation 26 may have a shell body, a solid body or a combination thereof. Thus, in one embodiment control apparatus 22 and the portion of essential module 24 are surrounded by the shell body of armored encapsulation 26 and in another embodiment the portion of essential module 24 and/or control apparatus 22 are integrated in the solid body armored encapsulation 26.

Armored encapsulation 26 is preferably designed and constructed so as to prevent malfunctioning of control apparatus 22 by heating. Such malfunctioning prevention may be achieved in more than one way. For example, in one embodiment, armored encapsulation 26 comprises a material characterized by low heat capacity; in another embodiment armored encapsulation 26 comprises at least one reflective layer being for reflecting heat radiation therefrom; in an additional embodiment armored encapsulation 26 comprises at least two layers which are separated by a medium capable of preventing heat convection; in still an additional embodiment, armored encapsulation 26 is connected to the engine bay via a heat isolating interface, for preventing heat transfer from engine to armored encapsulation 26.

The heating of control apparatus 22 may also be prevented by selecting an appropriate material from which to form control apparatus 22. For example, if control apparatus 22 comprises one or more electronic circuit assemblies, these assemblies are preferably formed or implanted in a dielectric material which is selected to withstand high temperature. Additionally and preferably the dielectric material also withstands moisture, electrical sparks, mechanical vibrations and/or chemical vapors.

According to a preferred embodiment of the present invention, control apparatus 22 may be activated automatically when the vehicle is in a static state or, alternatively, control apparatus 22 may be activated by the user via a user interface device 28, electrically communicating with control apparatus 22, e.g., via a communication device 29. User interface device 28 also serves for deactivating control apparatus 22, before the vehicle departs. To prevent the use of user interface device 28 by an unauthorized person, user interface device 28 preferably comprises recognition circuitry, such as, but not limited to, keyed-in password recognition circuitry, spoken password recognition circuitry, biometric voice recognition circuitry, biometric fingerprint recognition circuitry, biometric bone structure recognition circuitry and/or biometric iris-patterns recognition circuitry.

Communication device 29 may also serve for communicating with a remote control center, thereby combining system 20 with an Automatic Vehicle Location (AVL) system. It should be understood that in certain systems, more than one communication device may be used, for example, a single system may use a short-range communication device for establishing communication between the user and control apparatus, and a long-range communication device for establishing communication between system 20 and the remote control center. Any of the communication devices may be wireless (e.g., employing a radiofrequency (RF) transmitter-receiver) or wired.

As used herein, the phrase communication device 29 interchangeably refers to any and all suitable communication devices.

Thus, if armored encapsulation 26 is partially damaged, communication device 29 transmits signals to an AVL operator, who may manually transmit responses back to communication device 29 for activating control apparatus 22, thereby to immobilize the vehicle.

According to a preferred embodiment of the present invention, system 20 may further comprise a self-destructing assembly 23 designed and positioned so that any attempt to open or punch armored encapsulation 26 results in a total electrical discontinuity. More specifically, if and when armored encapsulation 26 is at least partially damaged, self-destructing assembly 23 disintegrates and disables essential module 24.

One example of a self-destructing assembly 23 is a thin wide conductor, such as, but not limited to, flex wire circuits coupled with thin and protected wide connectors. The flex wire circuits disintegrate upon a violent attempt to open or punch armored encapsulation 26, and the protected wide connectors prevent the thief from creating an alternative contact ("hot-wiring"). Preferably, the self-destructing assembly is positioned in a non-accessible location, e.g., buried within armored encapsulation 26.

Before providing a further detailed description of system 20 for preventing theft of a vehicle, as delineated hereinabove and in accordance with the present embodiments, attention will be given to the advantages offered thereby.

The system operates at two protection levels. A first protection level is provided by control apparatus 22 which disables the functionality of essential module 24 when the vehicle is in a static state, and a second protection level is provided by armored encapsulation 26 when an attempt to bypass the first protection occurs. In this case, the design and installation of armored encapsulation 26 preferably causes essential module 24 to be damaged beyond immediate repair. Thus, since it is impossible to mobilize the vehicle without complete functioning of essential module 24, the theft is prevented.

Another advantage of the present embodiments over prior-art systems is that the present embodiments do not present a risk that might accidentally hamper the vehicle safety while in motion. It is recognized that many prior art systems, such as systems that are based on selective control of engine ignition circuits, fuel supply lines and the like, may become operative while the vehicle is mobile, for example due to malfunction or due to accidental activation. Such failure may lead to loss of ignition, engine stall and eventually loss of control by the driver due to the absence of power steering and power assisted braking.

A more detailed description of the preferred embodiments of the present invention is now provided.

Hence, in one embodiment, essential module 24 is the starter of the vehicle. In this embodiment control apparatus 22 is designed and constructed so as to control the operation of the starter. This may be done, for example, by controlling electrical signals transmitted through a signal wire which connects the ignition switch with the starter solenoid of the vehicle.

Figure 2A:
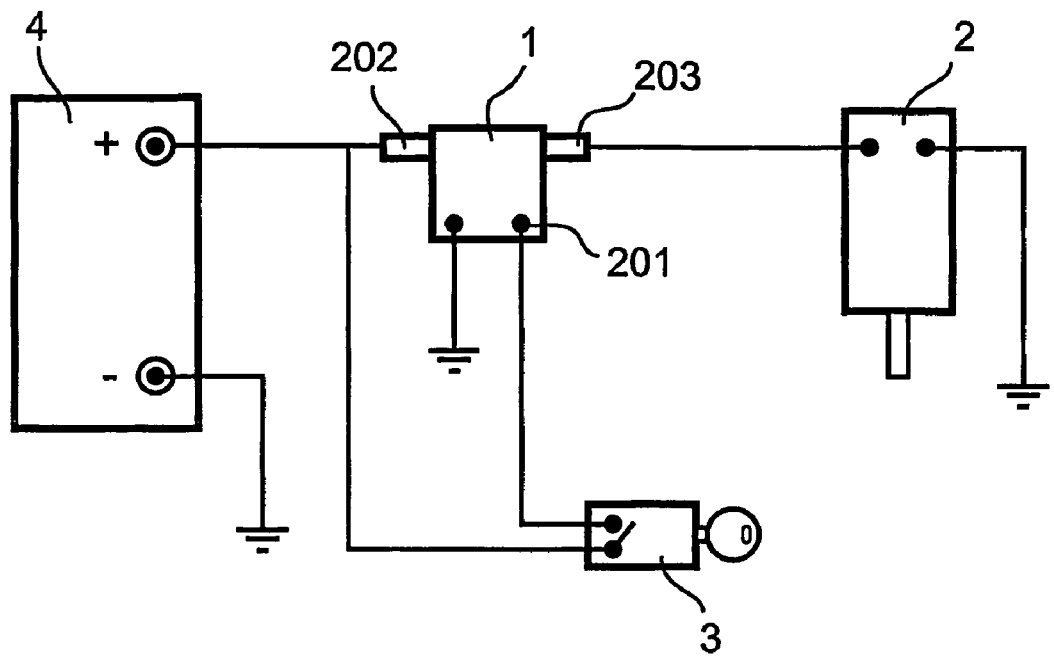
FIGS. 2a–b are schematic illustrations of an initial ignition circuit without (a) and with (b) the system for preventing theft of a vehicle, according to a preferred embodiment of the present invention.
Figure 2B:
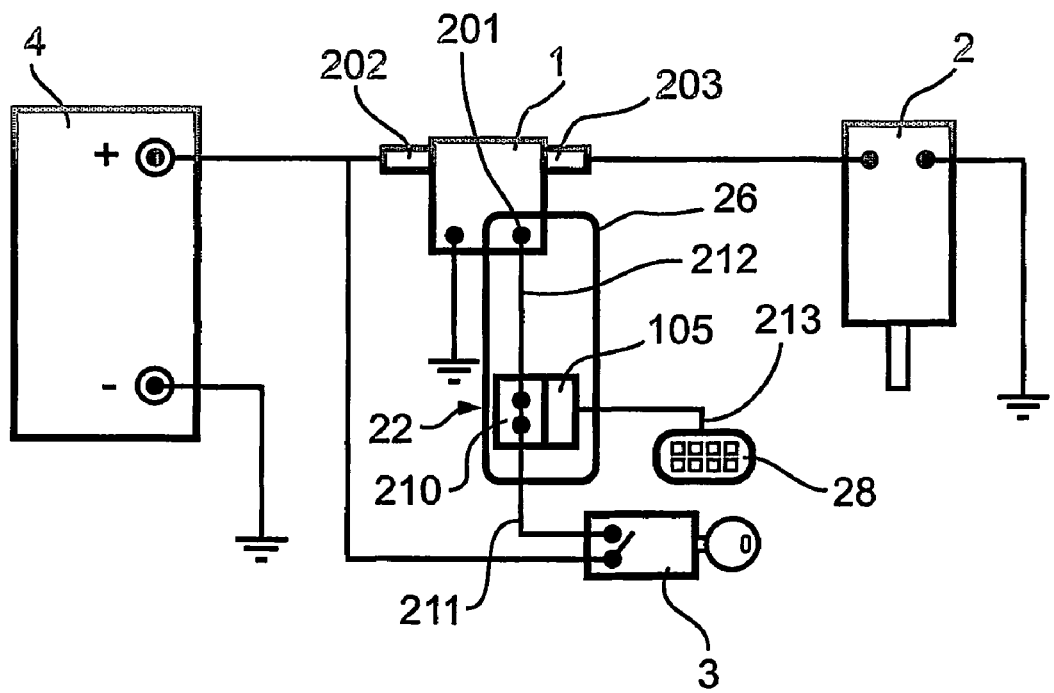

Reference is now made to FIGS. 2a–b which are schematic illustrations of an initial ignition circuit without (FIG. 2a) and with (FIG. 2b) the system for preventing theft of the vehicle, as delineated hereinabove. The initial ignition circuit commonly includes a solenoid 1, a starter motor 2 and an ignition switch 3. Solenoid 1 is typically connected to a power-supply unit 4 via a "B" terminal 202; to starter motor 2 via an "M" terminal 203 and to ignition switch 3 via an "S" terminal 201. The "S" terminal is connected to a signal wire having a first end 211 and a second end 212. Terminals 201, 202 and 203 typically carry a voltage of 12, 24 and/or 42 volts DC, but other voltage values are not excluded. "S" terminal 201 typically carries a low power signal, while the power carried by terminals 202 and 203 is typically higher. Solenoid 1, starter motor 2 and power-supply unit 4 are typically grounded to a large conductive material, e.g., to the vehicle body.

Figure 3A:
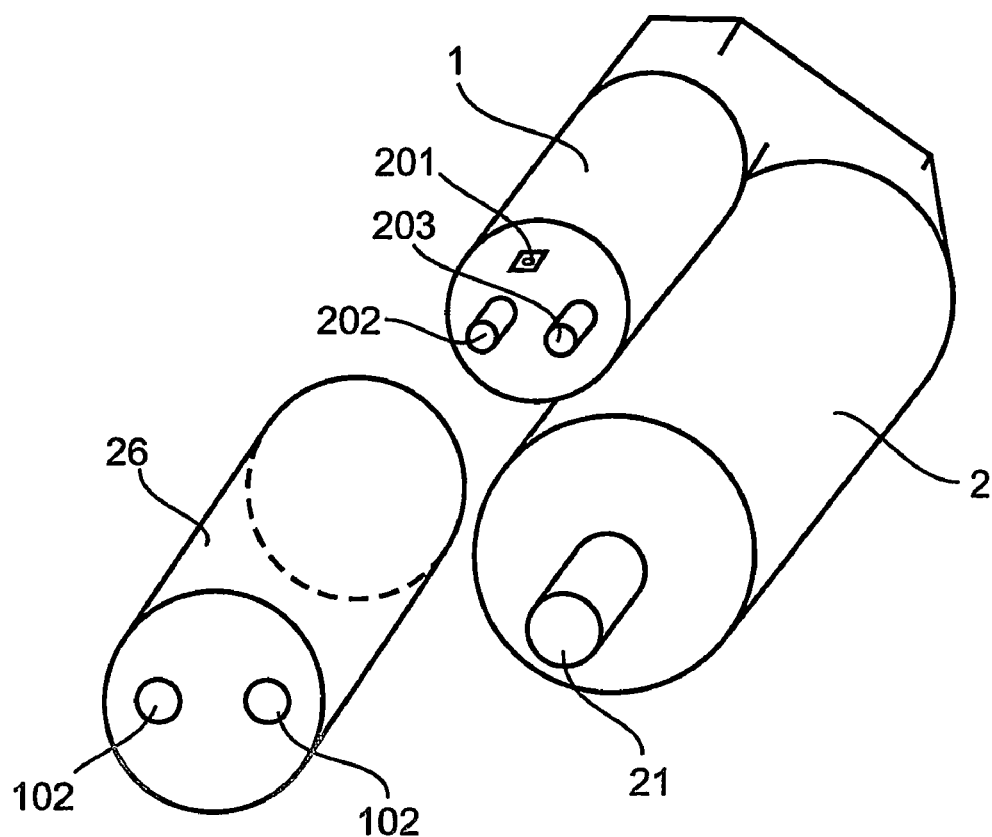
FIG. 3a is a schematic illustration of a starter, a solenoid and armored encapsulation, according to a preferred embodiment of the present invention.

Reference is now made to FIG. 3a, which is a schematic illustration of starter motor 2, solenoid 1 and armored encapsulation 26. When ignition switch 3 is switched on and pressed further to a spring-loaded position, solenoid 1 supplies high current to motor 2. Once supplied with sufficiently high current, a shaft 21 of motor 2 engages a compatible shaft in the vehicle's engine (not shown). At the same time, shaft 21 rotates the compatible shaft thereby enabling initial ignition or cranking of the engine.

According to a preferred embodiment of the present invention, control apparatus 22 comprises a relay 210 and an electronic circuit 105 controlling relay 210, so as to toggle signal wire 211/212 between a transmissive state and a non-transmissive state. As stated, control apparatus 22 preferably communicates with a user interface device 28. In this embodiment, user interface device 28 communicates with circuit 105, e.g., via wire 213 or via communication device 29 (not shown in FIGS. 2a–b), and hence serves for operating relay 210, depending on the choice of the authorized user. As stated, communication device 29 may also be wireless, thus, the electrical communication between user interface device 28 and circuit 105 is preferably by RF radiation.

Thus, when signal wire 211/212 is toggled by relay 210 to a non-transmissive state, signals cannot be transmitted from first end 211 to second end 212, and motor 2 does not engage the engine. According to a preferred embodiment of the present invention the size of armored encapsulation 26 is selected to encapsulate essentially "S" terminal 201, control apparatus 22 (including relay 210 and circuit 105) and first end 211. The protection of terminals 202 and 203 is not required because supplying power to these terminals only causes motor 2 to rotate without being engaged to the engine, thus cranking does not occur.

A particular advantage of the presently preferred configuration of this embodiment is that, unlike prior art systems, only a portion of the starter components are encapsulated, whereas other, relatively large, components are not encapsulated. One ordinarily skilled in the art would appreciate that such configuration minimizes the size of the system and hence facilitates easy installation, and, in addition, minimizes undesired intervention of the system with other vehicle systems. The present embodiment therefore keeps the maintainability of both pre-existing new vehicles.

Armored encapsulation 26 is preferably manufactured cylindrically (see FIG. 3a) so as to allow the encapsulation of "S" terminal 201, circuit 105, relay 210 and first end 211. Preferably, armored encapsulation 26 is manufactured with one or more openings 102, to facilitate mounting of armored encapsulation 26 on terminals 202 and/or 203, as further detailed hereinunder with reference to FIG. 4a.

The present embodiments successfully provide a solution to the problems associated with installation of system 20 in pre-existing vehicles. It is appreciated that the solenoids of different vehicle may differ in the positions of terminals 202 and 203 thereon.

Figure 3B:
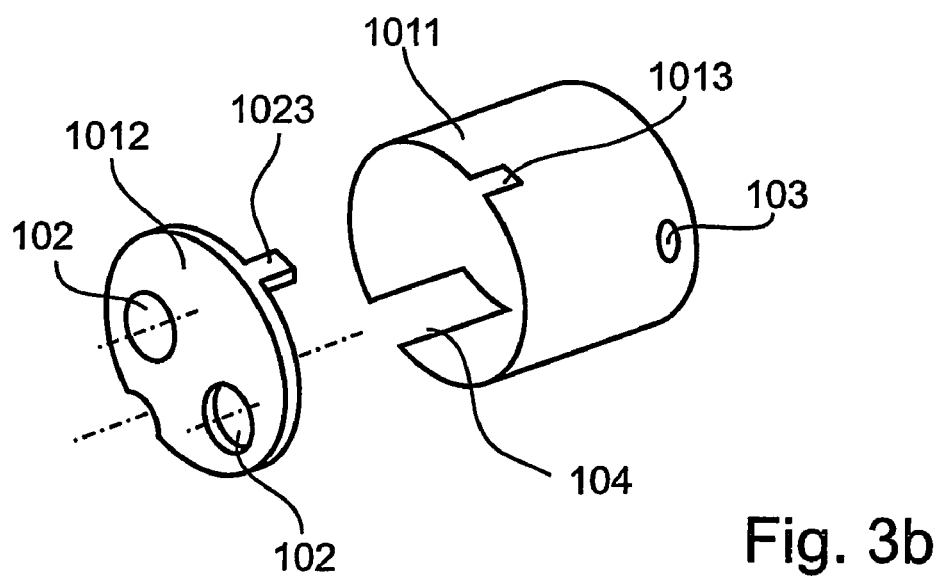
FIG. 3b is a schematic illustration of an armored encapsulation unit having two parts, according to a preferred embodiment of the present invention.

Reference is now made to FIG. 3b, which is a schematic illustration of an alternative design of armored encapsulation 26, according to a preferred embodiment of the present invention. In this embodiment, armored encapsulation 26 comprises a first part 1011 and a second part 1012, second part 1012 serves as a base for first part 1011, so that a relative orientation between first 1011 and second 1012 part may vary, depending on the type of solenoid 1.

A preferred shape of armored encapsulation 26 is, as stated, a cylinder, so as to match the shape of solenoid 1. It happens to be that the physical separation between terminals 202 and 203, and the diameters of solenoid 1, terminal 202 and terminal 203 are typically uniform for most existing vehicles of the same manufacturer, and often even between different manufacturers. On the other hand, the orientation of terminals 202 and 203 relatively to starter motor 2 is different from one vehicle type to the other.

Thus, for a cylindrical armored encapsulation 26, second part 1012 preferably shaped as a disk, having openings 102 through which terminals 202 and 203 can protrude. The installer can rotate second part 1012 relatively to first part 1013 until the relative orientation between first 1013 and second 1012 parts matches the relative orientation between terminals 202 and 203 and starter motor 2. Several sizes of armored encapsulation 26 may be manufactured, so that armored encapsulation 26 is also compatible with non-standard diameters of solenoid 1 and/or terminals 202 and 203.

A skilled artisan would appreciate that the presently preferred embodiment of the invention, in which armored encapsulation 26 is composed of two parts, eases the installation of system 20 on most existing vehicles without reducing the level of protection to solenoid 1 provided by armored encapsulation 26.

Second part 1012 is manufactured compatible with first part 1011 so that once first part 1011 is covered by second part 1012, armored encapsulation 26 is essentially a complete, unopenable, unit. The compatibility between first 1011 and second 1012 parts may be achieved, for example, by manufacturing armored encapsulation 26 with at least one positioning pairs such as, but not limited to, a pin 1023 (say, on second part 1012) and a compatible groove 1013 (say, on first part 1011). The number of positioning pairs determines the number of predetermined angles at which second part 1012 may be rotated relative to first part 1013. Alternatively, the compatibility between first 1011 and second 1012 parts may be achieved by gluing, welding, joining by pressing or using any other known method to attach second part 1012 to first part 1011, once correctly positioned.

According to a preferred embodiment of the present invention first part 1013 may comprise an additional opening 104 to accommodate close-fit installations in cases where solenoid 1 is close to or touches the starter motor 2.

The cylindrical shape of armored encapsulation 26 shown in FIG. 3 is further advantageous in that it makes it more difficult to grip by a tool. Thus, armored encapsulation 26 either remains closed or the level of control by the thief is reduced, inflicting irreversible damage and malting it difficult for him to use skill in order to overcome the system. In the latter case "S" terminal 201 (or any other appropriate terminal, such as, but not limited to, "B" terminal 202 or "M" terminal 203) is substantially damaged thereby rendering solenoid 1 useless.

Figure 4A:
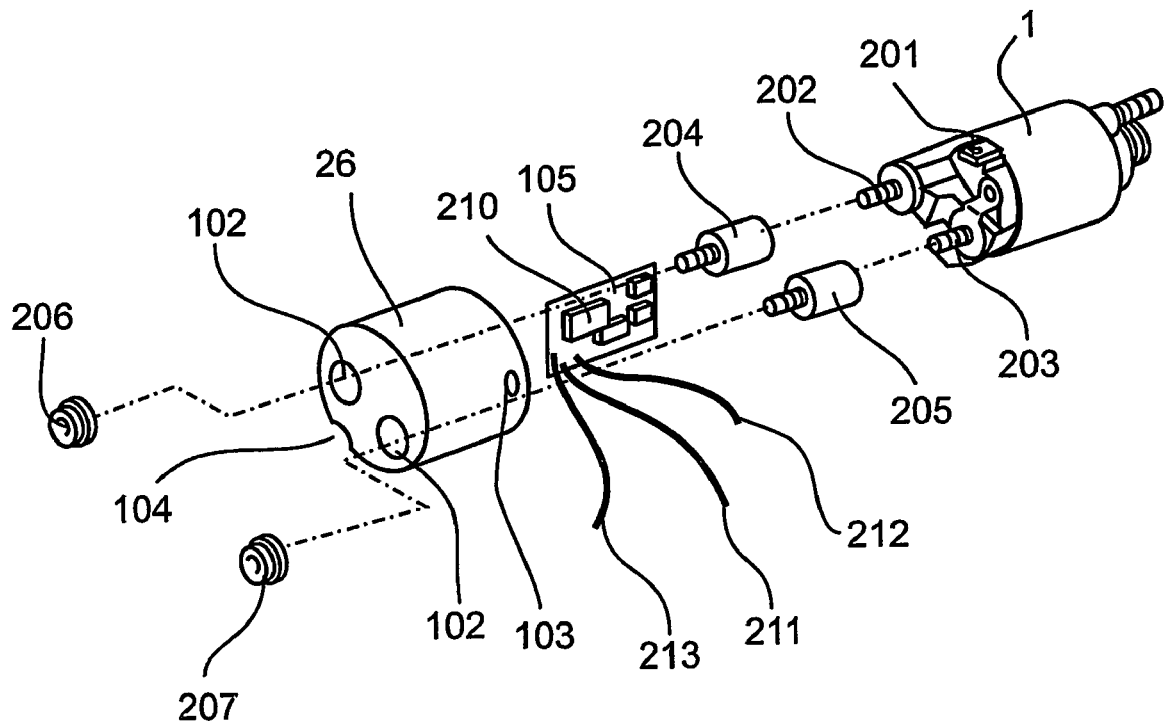
FIG. 4a shows relative locations and connection between the various parts of the system and the solenoid, according to a preferred embodiment of the present invention.
Figure 4B:
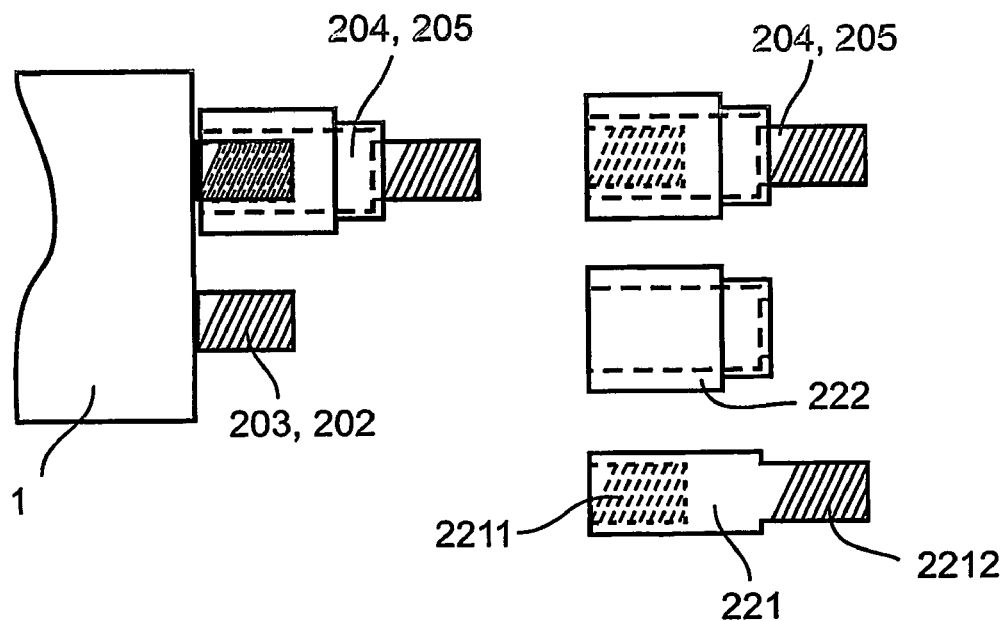
FIG. 4b is a schematic illustration of elongators which are used according to a preferred embodiment of the present invention.

FIG. 4a–b is a more detailed illustration of system 20 and solenoid 1. In particular, FIG. 4a–b shows relative locations and connection between the various parts of system 20 and solenoid 1, according to a preferred embodiment of the present invention. One or more elongators are used to define an inner volume for circuit 105 so as to avoid electric shortcuts, while maintaining compatibility with the original wiring of the vehicle.

Two such elongators are shown in FIGS. 4a–b, designated as elongator 204 and elongator 205. The elongators (e.g., elongators 204 and 205) are preferably sizewise compatible with circuit 105 and, in addition, geometrically compatible with terminals 202 and 203 of solenoid 1, so that circuit 105, the elongators, terminals 202/203 and armored encapsulation 26 form a substantially compact assembly.

With reference to FIG. 4b, the elongators are preferably manufactured with an internal thread 2211, designed to be compatible with terminals 202 and 203 of solenoid 1, and an external thread 2212, designed to match the original power wires such as power line 711 and nuts and at least one security nut (e.g., two security nuts, designated 206 and 207), as further detailed hereinafter. In case terminals 202 and 203 are differently shaped, internal thread 2211 is shaped in accordance with its respective terminal. Elongators 204 and 205 are preferably made of a combination of a conductive part 221 and an insulating part 222. Conductive part 221 is preferably adjacent to thread 2211 whereas insulating part 222 is preferably on the other side of elongators 204 and 205. Insulating part 222 serves for avoiding electrical contact between armored encapsulation 26 and conductive parts 221 and/or terminals 202 and 203. Preferably, conducting part 221 is shaped to correspond to its respective terminal (202 or 203) so as to facilitate the connection of the original vehicle electric contacts (not shown) to elongators 204 and 205 without the need for further modification of integral parts of the vehicle.

Openings 102 of armored encapsulation 26 (see also FIG. 3*a*–*b*) preferably match the size and shape of elongators 204 and 205. Preferably, armored encapsulation 26 is manufactured with an additional opening 103 (see also FIG. 3*b*) through which wires 211 and 213 (or RF antenna) may be routed. According to a preferred embodiment of the present invention, opening 103 is so located on armored encapsulation 26 so as to prevent any access to circuit 105 through opening 103.

Security nuts 206 and 207 are used to fix armored encapsulation 26 into position, so as to prevent future attempts at removal. One way of achieving such an effect is to select as security nuts 206 and 207 of a kind which may not be reopened once screwed onto elongators 204 and 205.

Figure 4C:
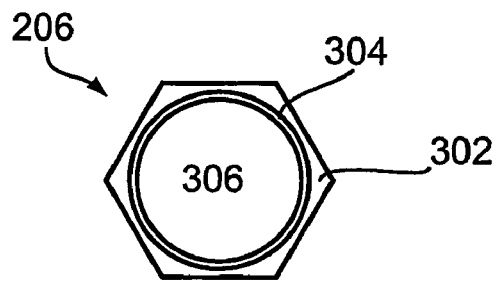
FIGS. 4c–d are schematic illustrations of security nuts, according to a preferred embodiment of the present invention.
Figure 4D:
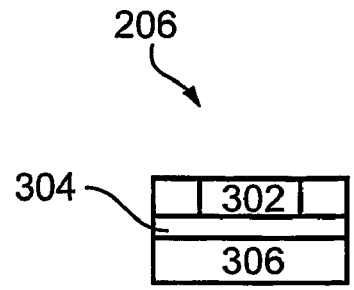

FIGS. 4*c*–*d* are schematic illustrations of security nuts 206 and 207, according to a preferred embodiment of the present invention. Each one of security nuts 206 and 207 may comprise three parts: a first part 302, designed as a regular shell of a screw nut, so as to withstand a predetermined maximal tightening force; a second part 304, designed to withstand predetermined maximal shear forces; and a third part 306 designed to prevent reopening using a conventional opening tool. First 302 second 304 and third 306 parts are preferably concentric and may be arranged either radially (FIG. 4*c*) or axially (FIG. 4*d*).

First part 302 serves for allowing the respective security nut to be mounted, and tightened, in one embodiment using a conventional tool, and in another embodiment using a special tool. Second part 304 is preferably manufactured sufficiently thin so that a shear force higher than the predetermined maximal shear forces results in breaking of second part 304 and detachment of first part 302 therefrom. Third part 306 is the part that remains on elongator 204 and 205. Preferably, third part 306 is essentially round (e.g., spherical, cylindrical, conical) and is sufficiently small so that a conventional tool slips off upon a reopening attempt.

Thus, once armored encapsulation 26 is positioned so that threads 2212 protrude through openings 102, security nuts 206 and 207 are tightened thereon. Then, the installer ensures that the system operates and properly mounted and tightens security nuts 206 and 207 forcibly, exceeding the maximal tightening force. The high shear force resultant in breaking of second part 304 and detachment of the first part 302 from the third part 306, thereby preventing reopening of armored encapsulation 26.

According to a preferred embodiment of the present invention, security nuts 206 and 207 may be shaped so that the installation is not completed until first part 302 is detached from third part 306, thereby ensuring a correct installation procedure. This may be achieved, for example, by selecting the combined longitudinal dimension of first part 302 and second part 304, so that security nuts 206 and 207 encapsulate external thread 2212 of elongators 204 and 205. Alternatively, external thread 2212 may be integrated with third part 306, which thus can be is accessible only after first 302 and second 304 have been detached. In this alternative, elongators 204 and 205 matches the security nuts, but not the size required for installation of the electric wires.

As stated, external thread 2212 is designed to match the original power wires (e.g. line 711) and nuts of the vehicle, hence, the temporarily encapsulation of external thread 2212 causes malfunctioning in the system or the solenoid. Only once the installer applies the required force and breaks second part 304 thread 2212 is revealed and the installation procedure can be continued (e.g., by re-connecting the original wires of the vehicles thereto).

Figure 5:
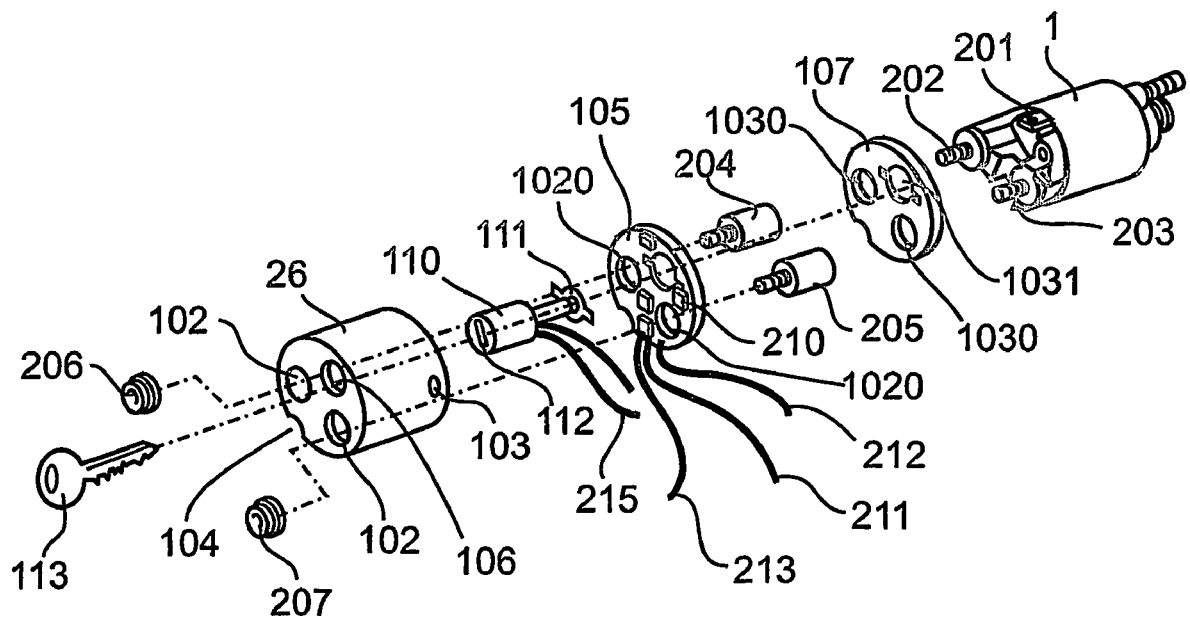
FIG. 5 shows relative locations and connection between the various parts of the system and the solenoid, together with a locking device, which may be used according to a preferred embodiment of the present invention.

Reference is now to FIG. 5, which is a more detailed illustration of system 20 and solenoid 1, according to a preferred embodiment of the present invention, in which system 20 further comprises a locking device 110, for allowing reopening of armored encapsulation 26 by an authorized person, e.g., for maintains or repair purposes. Locking device 110 may be any known locking device, for example a key-based lock cylinder having a keyhole 112 or a password-based electrical locking device. The advantage of this embodiment is that the authorized person can access the interior of armored encapsulation 26 without the need for destructive actions. In this embodiment, armored encapsulation 26 is preferably formed with an additional opening 106, designed to match the inner shape of locking device 110 and to facilitate opening and closing of locking device 110, e.g., by entering a pre-programmed password or by using a key 113 designed compatible to keyhole 112.

Specifically, according to one embodiment, when locking device 110 is in a predetermined position, a locking element 111, connected to locking device 110, engages a lock hole 1031 positioned in a mounting plate 107, and thereby mounts armored encapsulation 26 to solenoid 1. Mounting plate 107 may be connected to the terminals 202 and 203, to elongators 204 and 205 or to the body of solenoid 1. Mounting plate 107 is preferably manufactured with two holes 1030 each compatible with one of elongators 204 and 205. Alternatively, circuit 105 may serve as mounting plate 107. In this alternative, lock hole 1031 is preferably formed in circuit 105. The advantage of using circuit 105 as the mounting plate is that if locking device 110 is forcibly attacked circuit 105 is damaged beyond immediate repair.

The present embodiments successfully address the rare possibility of system failure and provide an optional bypassing procedure to allow starting of the vehicle, e.g., in case of emergency or malfunction of user interface device 28. Hence, according to a preferred embodiment of the present invention, locking device 110 may also serve for bypassing control apparatus 22. For example, an additional electrical wire may be routed from an electrical switch controlled by locking device 110 to first end 212 (see FIGS. 2*a*–*b*). Thus, locking device 110 may be used (e.g., using key 113) to establish contact between first end 211 and second end 212 thereby to bypass circuit 105.

It is to be understood that circuit 105 may be bypassed also in embodiments in which locking device 110 is not included, e.g., using a bypassing device which is connected similarly to locking device 110. In this embodiment, the bypassing device is preferably equipped with an appropriate mechanical or electrical recognition utility, as further detailed hereinabove.

The operation of the starter may also be controlled by positioning control apparatus 22 within solenoid 1, so that the original solenoid housing serves as armored encapsulation 26.

Figure 6:
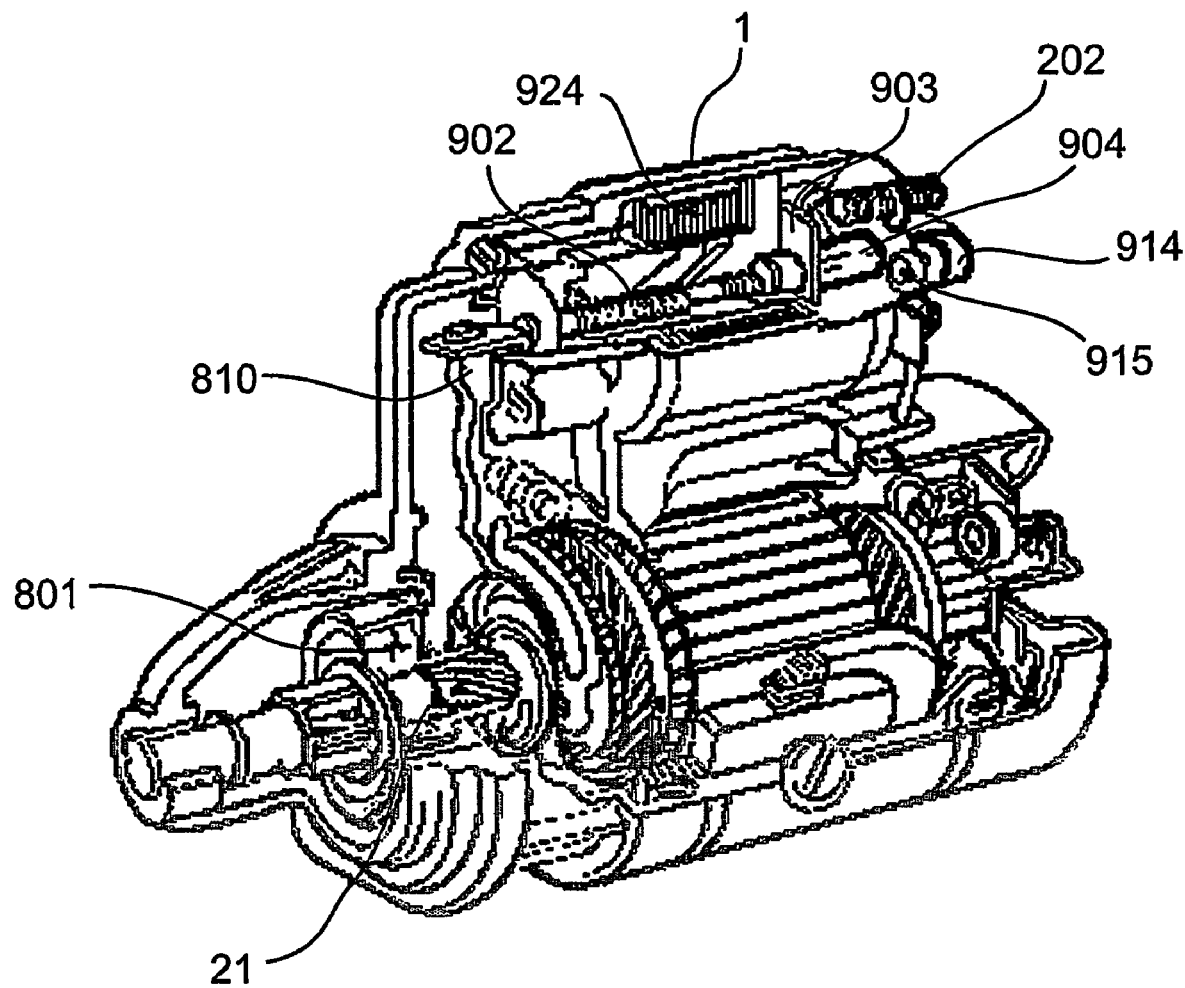
FIG. 6 is a schematic illustration of a complete starter assembly.
Figure 7:
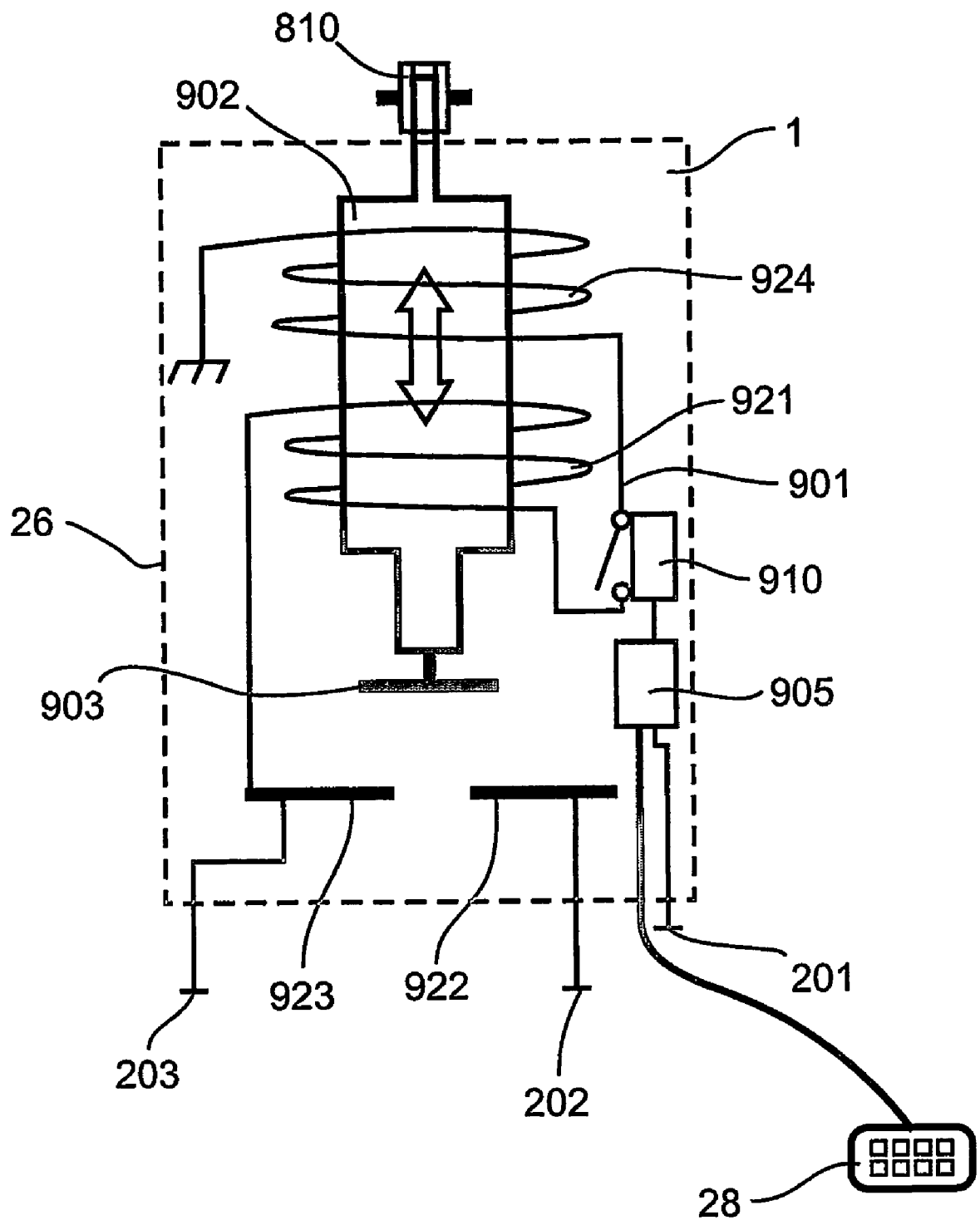
FIG. 7 is a schematic illustration of the interior portion of a solenoid in which an internal plunger is controlled electrically, according to a preferred embodiment of the present invention.

Reference is now made to FIG. 6 and FIG. 7, which are schematic illustrations of the complete starter assembly (FIG. 6) and of the interior portion of solenoid 1 (FIG. 7). In principle, the operation of solenoid 1 is as follows. An internal plunger 902 is wound by two wires, a "hold-in" wire 924 and a "pull-in wire" 921. Wire 924 (the "hold-in" wire) serves for holding internal plunger 902 in its position when the starter assembly is not in use. Internal plunger 902 is manufactured with a contact 903 which serves for closing an electrical circuit between "M" terminal 203 and "B" terminal 202, when the starter assembly is in operation mode. Specifically, when an electric current flows through wire 921 (the "pull-in" wire), magnetic forces, generated in the volume defined by the windings of wire 921, pull internal plunger 902 to establish an electrical contact between an internal contact 923 of "M" terminal 203 and an internal contact 922 of "B" terminal 202. The electrical connection between "M" terminal 203 and "B" terminal 202 allows high electric current to flow to motor 2, which starts to rotate. While moving towards contact 922 and 923, internal plunger 902 pulls a mechanical shift lever 810 connected to shaft 21 via a clutch device 801. Thus, simultaneously with the rotation of motor 2, shaft 21 engages the engine shaft of the vehicle (not shown) generating the initial compression required for ignition or cranking thereof.

According to a preferred embodiment of the present invention control apparatus 22 is designed and constructed to control motion of lever 810 so that when system 20 is operative the engagement between shaft 21 and the engine's shaft is prevented. Alternatively, control apparatus 22 may be designed and constructed to control motion of an internal plunger 902 of solenoid 1. It will be appreciated that when internal plunger 902 is disabled, lever 810 and shaft 21 are also immobilized and therefore, even if a thief successfully interconnects terminals 202 and 203 (e.g., by an external current bridge), no initial ignition/cranking can occur. The control of the motion of internal plunger 902 may be done either mechanically or electrically, as further explained hereinbelow.

Hence, in one embodiment, control apparatus 22 comprises an electrical switch 910 which controls electrical signals transmitted through wire 921 and/or wire 924. In this embodiment, the motion of internal plunger 902 is prevented either by keeping the current flowing through wire 924 (the "hold-in" wire) thereby holding internal plunger 902 in its non-operative position, or by preventing current from flowing through wire 921 (the "pull-in" wire) thereby preventing the generation of magnetic forces in the direction of contact 922 and 923.

Thus, control apparatus 22 preferably comprises an electronic circuit 905 controlling a switch 910 positioned on a wire 901 connecting wire 921 and/or wire 924. Circuit 905 may also be in communication with user interface device 28, so as to allow the authorized user to activate or deactivate control apparatus 22 as described hereinabove.

Figure 8:
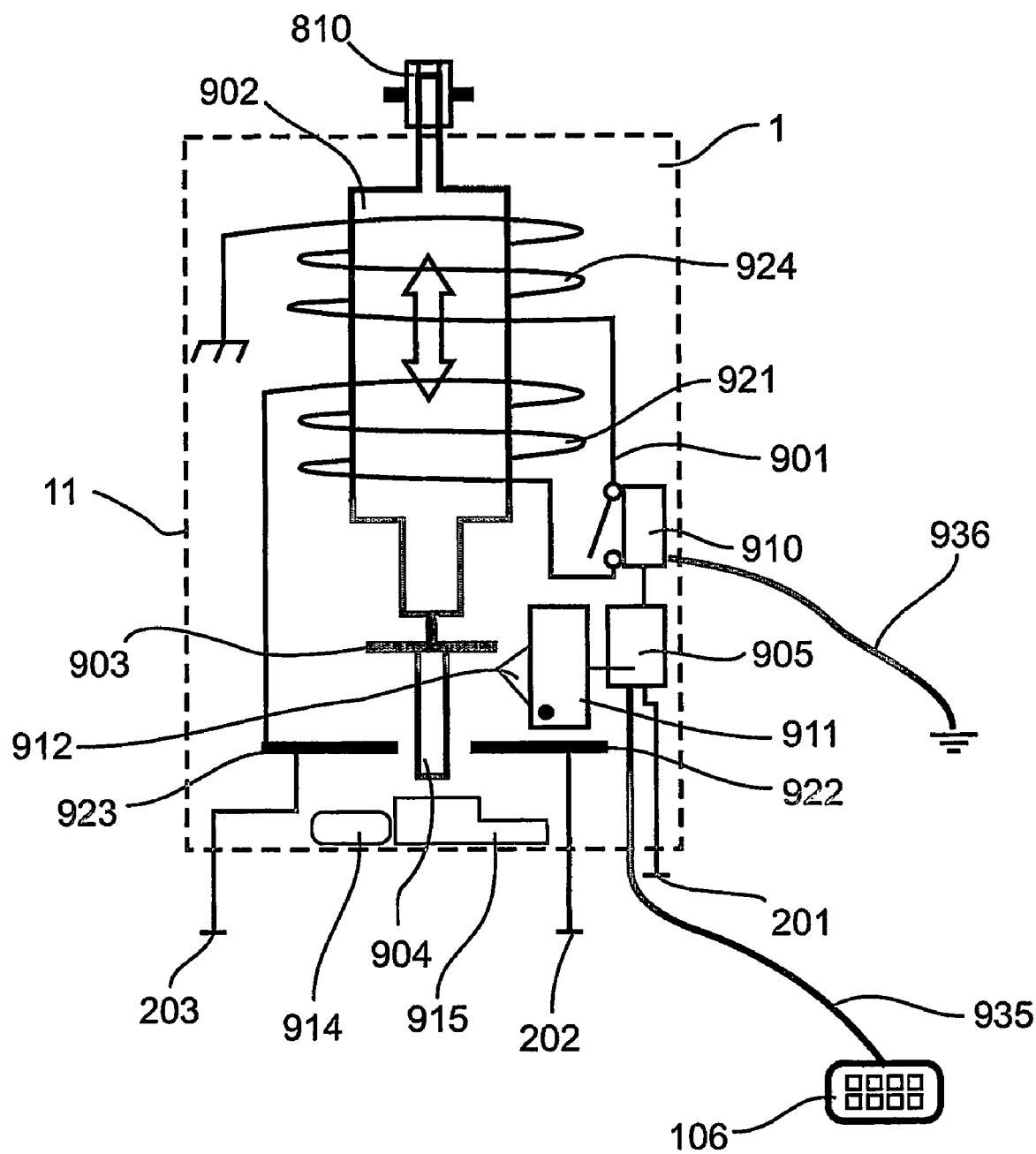
FIG. 8 is a schematic illustration of the interior portion of a solenoid in which an internal plunger is controlled mechanically, according to a preferred embodiment of the present invention.

Reference is now made to FIG. 8, which is a schematic illustration of the interior portion of solenoid 1 and system 20 in another embodiment in which a mechanical actuator 911 is used for controlling the motion of internal plunger 902. Hence, one alternative of this embodiment may be, for example, the use of a mechanical actuator 911 manufactured with a mechanical stopper 912, (e.g., a pin or a lever). Thus, control apparatus 22 preferably comprises mechanical actuator 911, mechanical stopper 912 and electronic circuit 905. In use, mechanical actuator 911 is controlled by electronic circuit 905 so that when the authorized user chooses to activate control apparatus 22, mechanical actuator 911 and stopper 912 limit the motion of internal plunger 902, thereby preventing the initial ignition/cranking of the engine by an unauthorized user.

Another alternative for mechanical control of the motion of internal plunger 902 may be the use of an elongation rod 904 connected to internal plunger 902 and a compatible blocking mechanism 915. According to a preferred embodiment of the present invention elongation rod 904 and its compatible blocking mechanism 915 are designed and constructed so as to selectively limit the motion of internal plunger 902. This may be done, for example, by selecting blocking mechanism 915 to have asymmetric height or width, so that the position and/or orientation of blocking mechanism 915 determines the nature (e.g., the amplitude) of motion of internal plunger 902. Specifically, when blocking mechanism 915 is in one position (say, "right" position, see FIG. 8), the motion of internal plunger 902 is limited and when blocking mechanism 915 is in another position ("left" position) the motion of internal plunger 902 is allowed. Other positions and/or orientations of blocking mechanism 915 are also not excluded from the scope of the present invention.

When the motion of internal plunger 902 is limited, no electrical contact is established between contacts 903, 923 and 922 and no ignition/cranking occurs. The change in position/orientation of blocking mechanism 915 may be achieved, for example, by a mechanical actuator 914 which, similarly to actuator 911, may be controlled, e.g., by electronic circuit 905. Additionally, and preferably, circuit 905 may be in communication with user interface device 28, as further detailed hereinabove.

The optional bypassing procedure mentioned hereinabove may also be employed in the embodiments in which the control apparatus limits the motion of internal plunger 902 or lever 810. Hence, according to a preferred embodiment of the present invention the bypassing device (which, as stated, may be realized by locking device 110) may disable any of the above mechanisms which limit the motion of internal plunger 902 or lever 810 (e.g., switch 910 mechanical actuator 911 or blocking mechanism 915).

As stated, essential module 24 may be any of the vehicle systems which is essential for the mobilization of the vehicle. According to a preferred embodiment of the present invention the essential module may be power-supply unit 4. In this embodiment, control apparatus 22 is designed and constructed so as to control the voltage of power-supply unit 4. It is appreciated, that a complete disablement of power-supply unit 4 may harm systems in the vehicle, such as emergency sub-systems logic processors memory units and the like. Thus, according to a preferred embodiment of the present invention, the number of disabled electrolytic cells is selected so as to prevent initial ignition or cranking of the engine on the one hand, while maintaining sufficient power for all other electrical functions on the other hand.

Figure 9A:
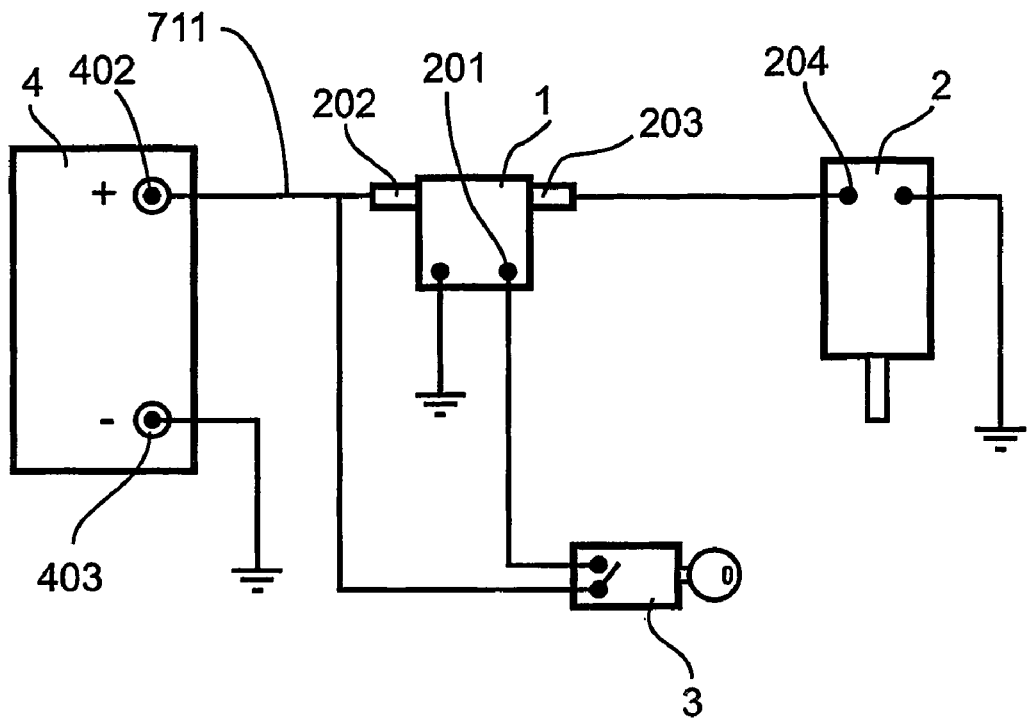
FIGS. 9a–c are schematic illustrations of the system in which a power-supply unit of the vehicle is electrically controlled, according to a preferred embodiment of the present invention.
Figure 9B:
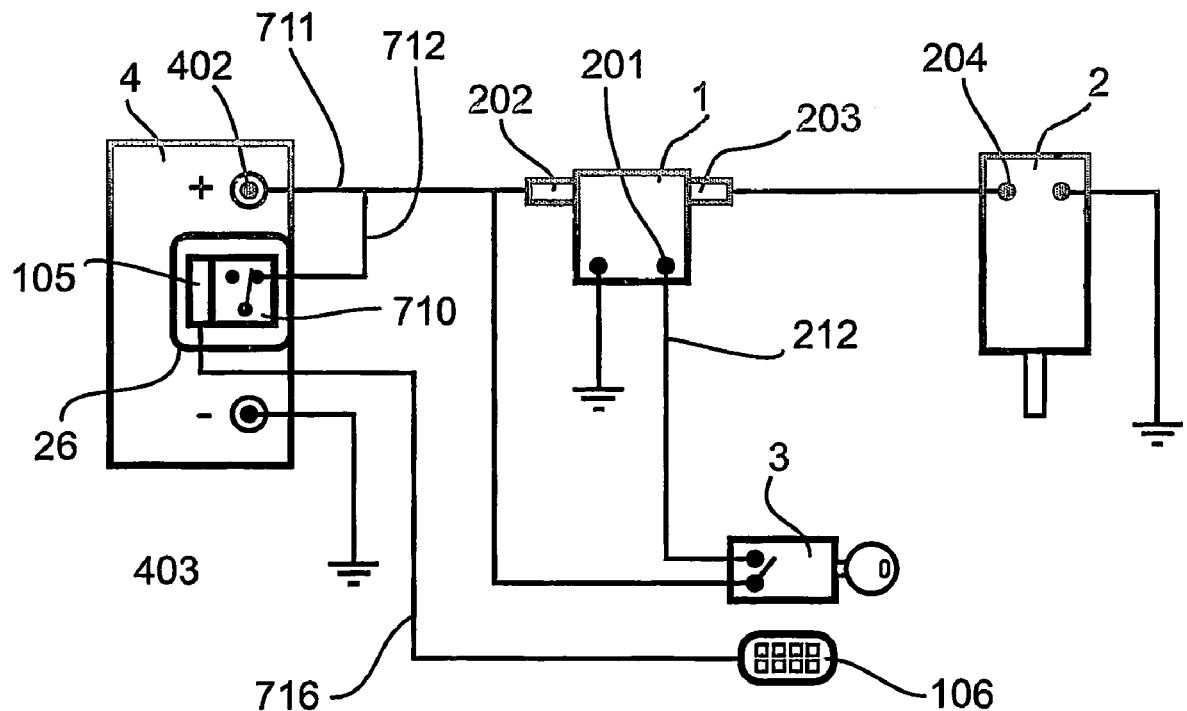
Figure 9C:
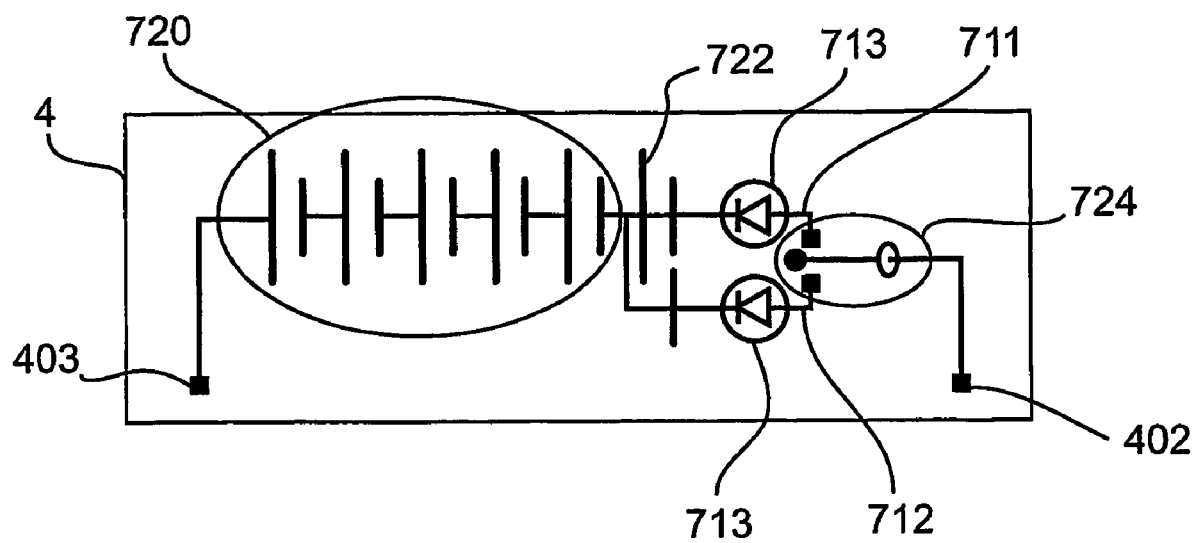

Reference is now made to FIGS. 9*a*–*c*, which are schematic illustrations of system 20 in the preferred embodiment in which control apparatus 22 controls power-supply unit 4. Referring to FIG. 9*a*, in a typical ignition circuit, power-supply unit 4 has a grounded terminal 403 and a "B" terminal 402 of power-supply unit 4 which is connected via a power line 711 to "B" terminal 202 of solenoid 1. Power line 711 is controlled by ignition switch 3. The potential difference between terminal 403 and terminal 402 is typically about 12, 24 or 42 volts, depending on the type of the vehicle, but other voltage values are not excluded.

As used herein the term "about" refers to ±10%.

Referring to FIG. 9b, according to a preferred embodiment of the present invention control apparatus 22 comprises a bypassing circuit 710 which bypasses a selective number of electrolytic cells of power-supply unit 4. Bypassing circuit 710 is preferably controlled by circuit 105, which, in common with the other embodiments, preferably communicates with user interface device 28.

The interior of power-supply unit 4 and bypassing circuit 710 are better illustrated in FIG. 9c. For simplicity, FIG. 9c shows six electrolytic cells of power-supply unit 4. However, the presently preferred embodiment may be applied on any number of electrolytic cells. Hence, of the six electrolytic cells, one electrolytic cell, designated 722, is bypassed while the remaining five electrolytic cells, designated 720, are not bypassed. Cell 722 is preferably bypassed by a semiconductor component, e.g., a diode 713 so as not to cause damage to power-supply unit 4. Bypassing circuit 710 comprises a relay 724 which toggles between a state in which cell 722 is bypassed and a state in which cell 722 is not bypassed. Bypassing circuit 710 may be either connected directly to terminal 402, or, alternatively, an additional wire 712 may be connected to power line 711. In any case, once cell 722 is bypassed, the voltage of power-supply unit 4 drops by the ratio between the number of bypassed cells to the total number of cells (about 17% in the example of FIG. 9c). If, for example, the regular voltage of power-supply 4 is 12 volt, in a bypassing state the voltage drops to about 10 volts. Such reduced voltage is sufficient for retaining the functionality of most electronic sub-systems, but does not provide sufficient power to operate the starter motor.

It is to be understood that the above description is for illustrative purpose and that the present embodiment can be applied with suitable adaptation to other kinds of power-supply unit. For example, the automotive vehicle industry has recently shown a tendency to move from a complex electrical sub-system to a simpler and more efficient power-net topology based on 36–42 volt nominal voltages distributed from central bus bars. As the different nominal voltage systems are expected to display similar electrical behavior as the traditional legacy systems, the present embodiment can be employed also on these systems, using proportionally higher voltage levels. Other power-supply units are based on super capacitors. The present embodiment can be employed on these systems, e.g., using two capacitors parallel, where one of which is selectively disconnected while the other continues to supply minimal power.

Figure 10:
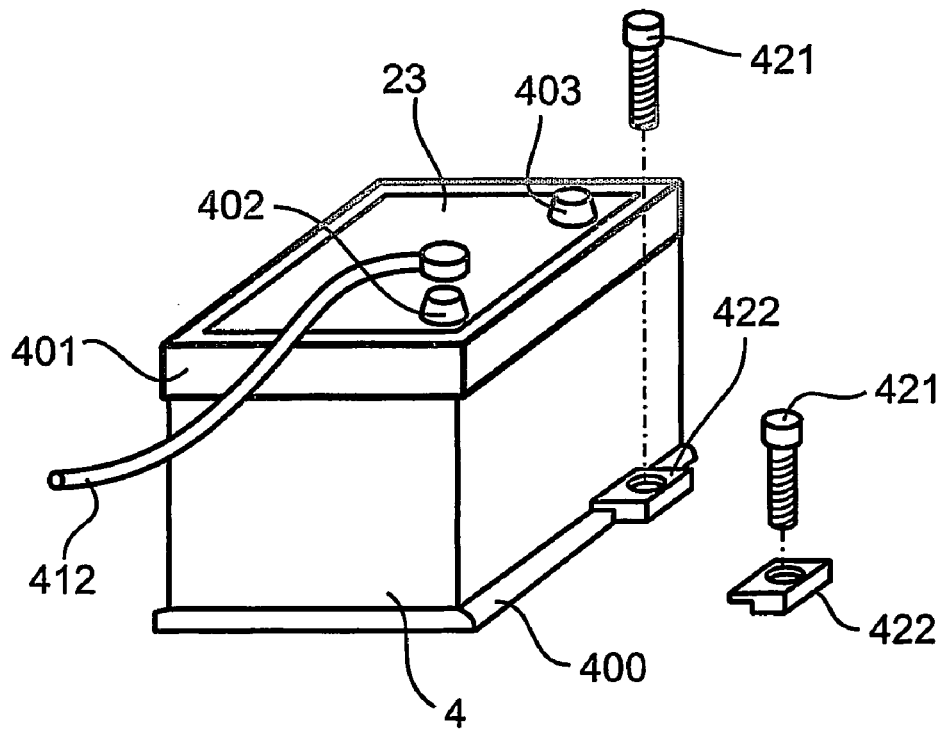
FIG. 10 is a schematic illustration of the power-supply unit and various protections thereof, according to a preferred embodiment of the present invention.

With reference to FIG. 10, according to a preferred embodiment of the present invention power line 711 may be externally protected, e.g., by an armored sleeve 412 encapsulating power line 711 and/or an armored cap 411 encapsulating terminal 402. Additionally, as stated, self-destructing assembly 23 may be positioned in the interior of power-supply 4 so that any attempt to open power-supply 4 and bypass control apparatus 22 results in substantial damage beyond immediate repair.

According to another aspect of the present invention there is provided a method of installing a theft-preventing system. The method comprises the following method steps which are illustrated in the flowchart of FIG. 11.

Figure 11:
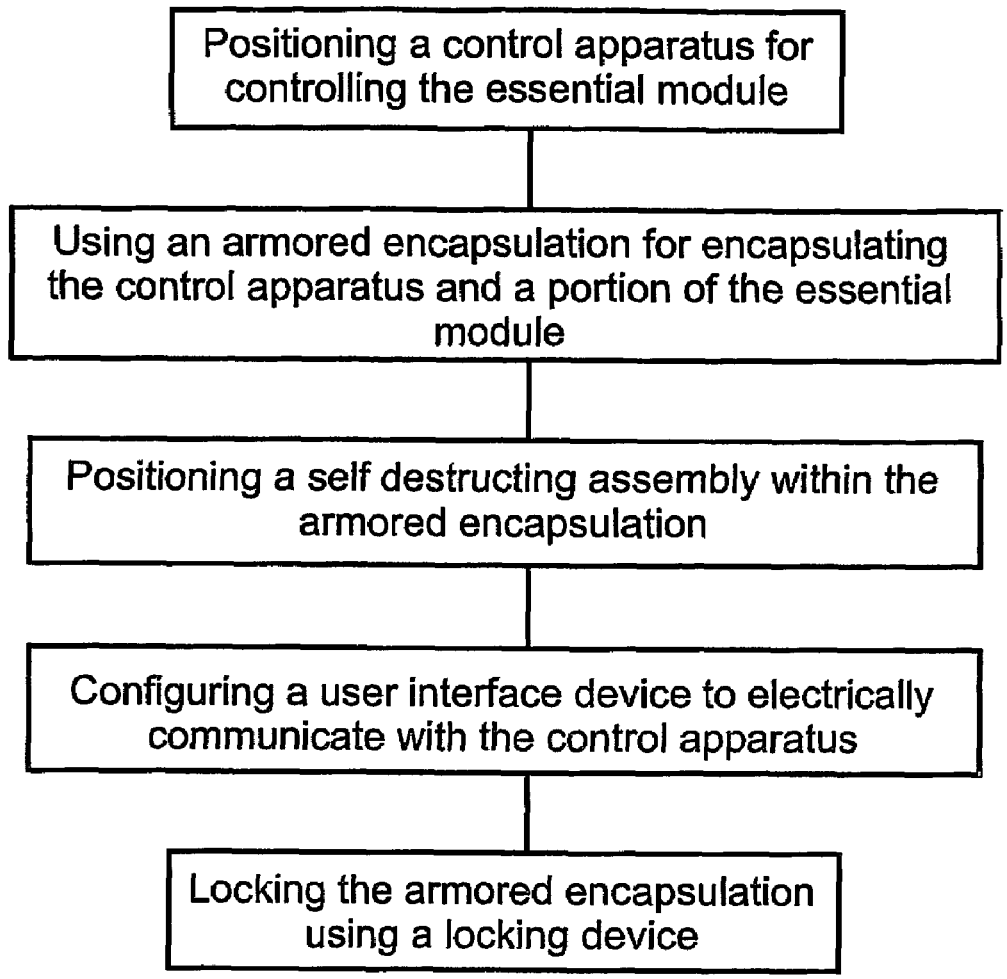
FIG. 11 is a flowchart of a method of installing a theft-preventing system, according to a preferred embodiment of the present invention.

Referring to FIG. 11, in a first step a control apparatus is provided and positioned so as to control operation of the essential module of the vehicle. The control apparatus may be, for example, similar to control apparatus 22. In a second step of the method, the control apparatus is encapsulated using at least one armored encapsulation (e.g., armored encapsulation 26). According to a preferred embodiment of the present invention the method may further comprise an additional step in which a self-destructing assembly is positioned within the armored encapsulation. The self-destructing assembly is arranged so that even if the armored encapsulation is only partially damaged, the self-destructing assembly disintegrates and disables the essential module. The self-destructing assembly may be any assembly which irretrievably disintegrates upon violent action, e.g., self-destructing assembly 23 as described hereinabove.

In addition, the method may further comprise another step in which a user interface device is configured to electrically communicate with the control apparatus, e.g., using a communication device, as further detailed hereinabove.

In addition, the method may comprise a step of locking the armored encapsulation using a locking device, so as to allow a removal of at least a part of the armored encapsulation solely by an authorized person.

Figure 12:
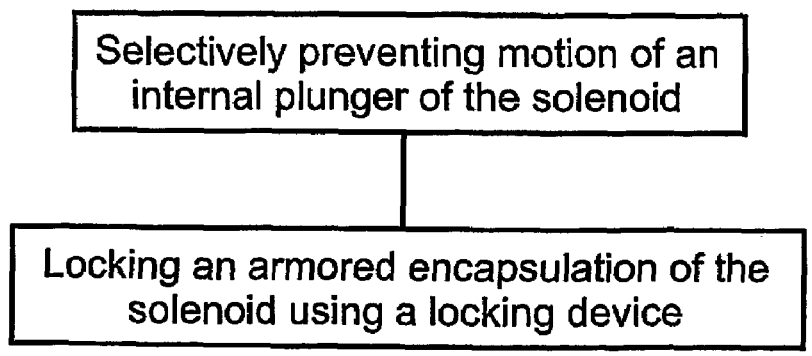
FIG. 12 is a flowchart of a method of preventing theft of a vehicle, according to a preferred embodiment of the present invention.

FIG. 12 is a flowchart of a method of preventing theft of a vehicle according to an additional aspect of the present invention. The method comprises selectively preventing motion of an internal plunger of the solenoid, thereby preventing initial ignition of the vehicle. As stated, the motion of the internal plunger is essential for starting the vehicle. Thus, upon a legitimate starting of the vehicle (e.g., using an ignition key, a valid code, etc.), the motion of the internal plunger is allowed so that shaft 21 engages a compatible shaft in the vehicle's engine (see FIG. 3). On the other hand, under circumstances interpreted as suspicious, the motion of the internal plunger is prevented, electrically or mechanically, as further detailed hereinabove. The allowance or disallowance of the motion of the internal plunger may be achieved, for example, using a user interface device (e.g., user interface device 23). In addition, according to a preferred embodiment of the present invention, the motion of the internal plunger may be irreparably disabled, if an attempt is made to attack the system.

Similarly to the above method, this method may comprise an optional step in which an armored encapsulation of the solenoid is locked using a locking device, so as to allow a removal of at least a part of the armored encapsulation solely by an authorized person.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for securing a motor vehicle against theft, the motor vehicle having a vehicle control device connected by a signaling link to a control node of a vehicle module essential to mobilization of the vehicle, the said essential module further having a power node connected to a power supply source, the apparatus comprising:
    an enable/disable control for conditionally disabling signaling along said signaling link,
    a user interface code input device communicating with said enable/disable control via a secure command link, and
    an armored encapsulation encapsulating said enable/disable control, said signaling link, and only said control node of said vehicle module essential to mobilization of the vehicle.

2. Apparatus according to claim 1, configured such that disabling said signaling renders inoperable said vehicle module essential for operation of said vehicle, said essential vehicle module being one of a group comprising: a starter, a solenoid of a starter, an integrated starter-alternator device, a Dynamo-Starter device, a starter-generator, a power supply unit, a hand brake, a gearshift selector and the electrical power part of a hybrid powered vehicle.

3. Apparatus according to claim 1, wherein said secure command link between the user interface code input device and the said enable/disable control is implemented as any one of a group comprising a wire link, a wireless link, infra-red link and an optical link.

4. Apparatus according to claim 1, wherein said armored encapsulation is designed and constructed to be locatable within an engine bay of a vehicle by being able to withstand an engine bay environmental condition being one of a group comprising high temperature, moisture, electrical sparks, mechanical vibrations and chemical vapors.

5. Apparatus according to claim 1, wherein said armored encapsulation is designed and constructed so as to prevent heating of said enable/disable control.

6. Apparatus according to claim 5, wherein said armored encapsulation is constructed by at least one of a group comprising:
    being constructed of a material characterized by low heat capacity,
    being sufficiently small so as to allow ventilation within an engine bay of said vehicle,
    integrating at least one reflective layer capable of reflecting heat radiation therefrom, comprising a heat isolating interface positioned between said armored encapsulation and an engine of the vehicle, and
    incorporating at least two layers separated by a medium capable of preventing heat convection.

7. Apparatus according to claim 1, wherein a body of said armored encapsulation is selected from the group consisting of a shell body and a solid body.

8. Apparatus according to claim 7, wherein said enable/disable control and said control node of the essential module are each independently integrated in said solid body of said armored encapsulation.

9. Apparatus according to claim 1, further comprising a self destructing assembly positioned within said armored encapsulation, said self-destructing assembly being designed and constructed so that if said armored encapsulation is at least partially damaged, said self-destructing assembly disintegrates, hence providing said damaging of at least one of said disable control, said signal wire and said control node.

10. Apparatus according to claim 9, wherein said at least partial damage is selected from the group consisting of being at least partially bent, being at least partially twisted, being at least partially strained, being at least partially opened, being logically disabled and being at least partially broken.

11. Apparatus according to claim 9, wherein said self-destructing assembly comprises a conducting foil forming a weak link.

12. Apparatus according to claim 1, wherein said enable/disable control comprises at least one electronic circuit assembly being formed in a dielectric material selected to withstand any one of high temperature, moisture, electrical sparks, mechanical vibrations and chemical vapors.

13. Apparatus according to claim 1, wherein said user interface code input device is configured to communicate user input codes to said enable/disable control via said secure command link, said codes providing criteria to conditionally toggle the state of said enable/disable control from a disabled state to an enable state, thus governing said enable/disable control.

14. Apparatus according to claim 13, wherein said user interface code input device comprises recognition circuitry for recognizing a user as a condition to allow access to the said enable/disable control.

15. Apparatus according to claim 14, wherein said recognition circuitry is selected from the group consisting of keyed-in password recognition circuitry, spoken password recognition circuitry, biometric voice recognition circuitry, biometric fingerprint recognition circuitry, biometric bone structure recognition circuitry, biometric iris-patterns recognition circuitry, and user personal identification device recognition circuitry.

16. Apparatus according to claim 1, further comprising a communication device, being able to communicate with a remote control center, said communication device being operable to transmit alert signals to said remote control center, if said armored encapsulation is at least partially damaged.

17. Apparatus according to claim 16 where the said communication device is positioned within the armored encapsulation, wherein the communication device is operable to transmit alert signals to the remote control center if the armored encapsulation is at least partially damaged.

18. Apparatus according to claim 1, further comprising at least one locking device for allowing a removal of at least a portion of said armored encapsulation by a predetermined procedure, without causing damage to said armored encapsulation.

19. Apparatus according to claim 1, where the said enable/disable control is designed and constructed to be automatically toggled from enabled state to disabled state when the vehicle is in a static state and an engine of said vehicle is not running for a predetermined time period.

20. Apparatus according to claim 1, further comprising at least one elongator positioned so as to increase a volume defined in said armored encapsulation, said volume being sufficient for encapsulating said enable/disable control.

21. Apparatus according to claim 20, wherein said at least one elongator is sizewise compatible with said enable/disable control and geometrically compatible with an existing component comprising one of said signal wire and said control node, so that said enable/disable control, said at least one elongator, said existing component and said armored encapsulation form a substantially compact assembly.

22. Apparatus according to claim 21, wherein said at least one elongator is constructed and designed for preventing electric contact between said armored encapsulation and at least one other part of the said compact assembly.

23. Apparatus according to claim 22, wherein said at least one elongator is made of a combination of a conductive material and an insulating material.

24. Apparatus according to claim 21, wherein said existing component is selected from the group consisting of a nut a bolt and a thread.

25. Apparatus according to claim 1, further comprising at least one anti-vandal security connector for fastening said armored encapsulation to a body of the vehicle, said at least one security connector being designed and constructed for preventing removal of said armored encapsulation.

26. Apparatus according to claim 25, wherein at least one of said at least one security connector comprises a first part, a second part and a third part, said second part being positioned between said first and said third part and comprises a detachable material so that if a shear force applied onto said first part exceeds a predetermined maximal value, said first part detaches from said third part.

27. Apparatus according to claim 26, wherein a shape of said third part is characterized by smooth edges designed so as to prevent opening of said third part, thereby to prevent removal of said armored encapsulation.

28. Apparatus according to claim 1, further comprising a bypassing device for bypassing said enable/disable control by a predetermined procedure.

29. Apparatus according to claim 28, wherein a locking device is integrated with said enable/disable control such that locking and unlocking at said locking device affects enabling and disabling of said enable/disable control.

30. Apparatus according to claim 29, wherein said locking device is selected from the group consisting of a key-based locking device and a password-based locking device.

31. Apparatus according to claim 29, wherein said locking device comprises an electrical switch connected to the essential module so that if a predetermined procedure is executed, said enable/disable control is bypassed.

32. Apparatus according to claim 28, wherein said bypassing device comprises an electrical switch being able to bypass said enable/disable control.

33. Apparatus according to claim 1, wherein said control apparatus is configured so as to control motion of an internal plunger of a starter solenoid of the vehicle, thereby to indirectly prevent a starter motor of the vehicle from rotating an engine of the vehicle.

34. Apparatus according to claim 33, wherein said control apparatus comprises an electrical switch operable to control electrical signals transmitted through a wire winding said internal plunger.

35. Apparatus according to claim 33, wherein said control apparatus comprises a mechanical actuator operable to limit said motion of said internal plunger.

36. Apparatus according to claim 33, wherein said control apparatus comprises an elongation rod, connected to said internal plunger, and a blocking mechanism, compatible with said elongation rod and positioned opposite thereto, said blocking mechanism and said elongation rod being designed and constructed so as to selectively limit said motion of said internal plunger.

37. The system of claim 1, wherein said control apparatus comprises a short circuit controlled by a switching device, said short circuit being connected to a power-supply unit of the vehicle so as to bypass at least one electrolytic cell of said power-supply, thereby to control a value of voltage supplied by said power-supply unit.

38. The system of claim 37, wherein said armored encapsulation is designed and constructed so as to encapsulate at least one terminal of said power-supply unit, at least one terminal of a starter solenoid of the vehicle and at least one wire connecting said at least one terminal of said power-supply unit and said at least one terminal of said starter solenoid.

39. A method of installing a theft-preventing system within a vehicle having a module being essential to mobilization of the vehicle and a signal wire connecting a vehicle control device to a control node of the essential module, the method comprising:

providing a control apparatus and positioning said control apparatus so as to control connection of said vehicle control device to said first control node via said signal wire; and encapsulating said control apparatus, said signal wire, and only said control node of said essential vehicle module using at least one armored encapsulation;

said encapsulation being such that at least one of a shape, configuration, material, size and location of said at least one armored encapsulation within the vehicle is selected so as to prevent accessing said control apparatus without substantially damaging said at least one armored encapsulation and said control node, said control apparatus, and said signal wire, thereby preventing the mobilization of the vehicle.

40. The method of claim 39, further comprising providing a self-destructing assembly and positioning said self-destructing assembly within said at least one armored encapsulation, wherein said self-destructing assembly is designed and constructed so that if said at least one armored encapsulation is at least partially damaged, said self-destructing assembly disintegrates, hence providing said damaging of at least one of said signal wire, said control apparatus and said first node.

41. The method of claim 39, wherein said damage is selected from the group consisting of said armored encapsulation, said first node, said control apparatus and said signal wire being at least partially bent, being at least partially twisted, being at least partially strained, being at least partially opened and being at least partially broken.

42. The method of claim 39, wherein said encapsulating comprises integrating said control apparatus and said at least a portion of at least one of said signal wire, said control apparatus and said first node within said at least one armored encapsulation.

43. The method of claim 39, comprising integrating said control apparatus and said at least said first control node and a communication device being operable to transmit alert signals to a remote control center within a body of said armored encapsulation.

44. The method of claim 39, wherein said control apparatus automatically toggles from an enabled state to a disabled state when the vehicle is in a static state and an engine of said vehicle is not running for a predetermined time period.

45. The method of claim 39, further comprising providing a heat isolating interface, and positioning said heat isolating interface between said at least one armored encapsulation and an engine of the vehicle, for preventing heat transfer from said engine to said at least one armored encapsulation.

46. The method of claim 39, further comprising providing a user interface code input device, and configuring the control apparatus to be responsive to user input codes received from said user interface device so as to toggle said control apparatus from an activated state to a deactivated state and vice versa.

47. A system for preventing theft of a vehicle having a starter switch, a starting solenoid and a starter motor operated from a first power node of said starter solenoid, a control node of said starter solenoid being connected to said starter switch such that said first power node operates said starter motor upon energizing of said control node due to operation of said starter switch, the system comprising:
   for controlling electrical signals transmitted through a signal wire connecting the starter ignition switch of the vehicle to the starter solenoid control node, thereby to conditionally disable said starter motor;
   a volume generating mechanism for generating a volume surrounding said control apparatus, said volume generating mechanism being compatible with at least one existing component of the starting solenoid; and
   a user interface device, electrically communicating with said control apparatus, said user interface device being designed and constructed for governing said control apparatus,
   at least one armored encapsulation, encapsulating said control apparatus and at least said control node;
   wherein at least one of a shape, configuration, material, size and location of said at least one armored encapsulation within the vehicle is selected so as to prevent accessing said control apparatus without substantially damaging said at least one armored encapsulation and said control apparatus, or said control node, thereby preventing the mobilization of the vehicle.

48. The system of claim 47, wherein said armored encapsulation comprises at least one hole matching the size and location of one or more starter solenoid power studs so as to enable mounting said encapsulation on said one or more power studs while physically protecting an initiation control stud, said encapsulation volume being sufficient for encapsulating said control apparatus.

49. The system of claim 47, wherein said control apparatus is designed and constructed to be automatically toggled from an enabled state to a disabled state when the vehicle is in a static state and an engine of said vehicle does not run for a predetermined time period, the status of the engine being perceived from analyzing electrical signals selected from at least one of a group comprising vehicle ignition wires, vehicle accessory wires and engine revolution signals.

50. The system of claim 47, wherein said volume generating mechanism comprises at least one elongator which is sizewise compatible with said control apparatus and geometrically compatible with at least one pre-existing component of said starting solenoid so that said control apparatus, said at least one elongator, said at least one pre-existing solenoid component and said at least one armored encapsulation form a substantially compact assembly.

51. The system of claim 50, wherein said at least one elongator is constructed and designed for preventing electric contact between said at least one armored encapsulation and at least a part of the said compact assembly.

52. The system of claim 50, wherein said at least one elongator comprises a combination of a conductive material and an insulating material.

53. The system of claim 50, wherein said at least one pre-existing component of the starting solenoid is selected from the group consisting of a power stud of the solenoid, an assembly thread of the solenoid body and a mounting nut of the solenoid shell.

54. The system of claim 47, further comprising at least one self-destructing assembly positioned within said at least one armored encapsulation, said self-destructing assembly being one of pre-existing electric studs of the solenoid and being firmly connected to the armored encapsulation so that if said at least one armored encapsulation is at least partially damaged, said stud detaches or disintegrates, hence providing an irreparable damaging of the starting solenoid.

55. The system of claim 47, wherein a body of said at least one armored encapsulation is generally compatible with the size of the starter solenoid and has at least one hole configured to fit the solenoid power studs, the form of the encapsulation being generally selected from the group consisting of a shell body and a solid body.

56. The system of claim 47, wherein said control apparatus, the control terminal of the starting solenoid, and the wire connecting the control node to the control apparatus are integrated in a body of said at least one armored encapsulation.

57. The system of claim 47, wherein the at least one armored encapsulation shape is generally selected from a cylindrical body resembling the solenoid or an elongated cylindrical derivative body having a non-perfect round cross section or a half-moon shape cross section.

58. The system of claim 47, further comprising at least one anti-vandal security connector, comprising a first part, a second part and a third part, said second part being positioned between said first and said third part and including a detachable material so that if a shear force applied onto said first part exceeds a predetermined maximal value, said first part detaches from said third part, thereby to prevent removal of said at least one armored encapsulation.

59. The system of claim 58, wherein at least one security connector is an anti-vandal nut located to fasten the armored encapsulation on to at least one point selected from the two power studs of the starter solenoid, mounting studs of the solenoid body or assembly screws of the solenoid cover shell.

60. The system of claim 59, wherein said anti-vandal nut comprises first and second detachable parts, and said first and second detachable parts are configured with a sufficiently large combined longitudinal dimension to fully encapsulate at least one elongator so as to require the removal of the detachable parts in order to enable re-connection of the power line to the stud.

61. The system of claim 47, further comprising a locking device designed and constructed for bypassing said control apparatus by a predetermined procedure and subsequently performing a re-connecting between the solenoid control stud and the vehicle starter switch in case of a system malfunction wherein said predetermined procedure is selected from the group consisting of a key-based locking device activation and a password-based locking device activation.

62. The system of claim 61, wherein said locking device comprises an electrical switch connected to the starting solenoid control node and to the starter switch so that if said predetermined procedure is executed, said control apparatus is bypassed.

63. The system of claim 47, wherein at least one switching device used to control the signaling wire from the starter switch to the solenoid is a solid-state device.

64. The system of claim 63, wherein said solid state device is a Field Effect Transistor (FET).

65. The system of claim 47, further comprising at least one locking device connecting between the armored encapsulation and a solenoid part for allowing a removal of at least a portion of said at least one armored encapsulation by a predetermined procedure, without causing damage to the starting solenoid and to the said at least one armored encapsulation.

66. A system for preventing theft of a vehicle having a starting system comprised of a group of subassemblies consisting of at least one of a starter switch, a starting solenoid and a starter motor, the system comprising:

a control apparatus for controlling operation of an electro-mechanical actuator control device installed inside a subassembly of the starting system, said electro-mechanical actuator control device being selectively operable to mechanically limit the motion of an original internal electro-mechanical mechanism which is essential to normal operation of the starting system, thereby preventing a starter motor of the vehicle from engaging and thus rotating an engine shaft of the vehicle.

a user interface code input device communicating with said control apparatus via a secure command link, and at least one armored encapsulation, encapsulating said control apparatus and at least one subassembly of the vehicle starting system;

wherein at least one of a shape, configuration, material, size and location of said at least one armored encapsulation within the vehicle is selected so as to prevent accessing said control apparatus without substantially damaging said at least one armored encapsulation and said control apparatus, or said control actuator, thereby preventing the mobilization of the vehicle.

67. Apparatus according to claim 66, wherein said secure command link between the user interface code input device and the said control apparatus is implemented as any one of a group comprising a wire link, a wireless link and an optical link.

68. Apparatus according to claim 66, wherein said control apparatus is positioned so as to selectively activate an electro-mechanical actuator control device operable to mechanically limit the motion of the starter internal mechanical coupler, thereby preventing a starter motor of the vehicle from engaging and thus rotating an engine shaft of the vehicle.

69. Apparatus according to claim 66, wherein said control apparatus is configured to limit a motion of a mechanical shift lever being operatively associated with a starter motor of the vehicle, thereby to indirectly prevent said starter motor from rotating an engine of the vehicle.

70. The system of claim 66, wherein said control apparatus comprises an electrical switch operable to control electrical signals transmitted through a wire winding said internal plunger, so that when said electrical signals are transmitted, said motion of said internal plunger is allowed, and when said electrical signals are terminated, said motion of said internal plunger is disabled.

71. The system of claim 66, wherein said control apparatus further comprises a bypassing device for bypassing said control apparatus by a predetermined procedure.

72. The system of claim 71, wherein said bypassing device is operable to disable said mechanical actuator in such a manner that said motion of said internal original electro-mechanical device is allowed.

73. A vehicular anti-theft security system for selectively disabling a vehicular subsystem in order to impede the unauthorized use of a vehicle, the disabled subsystem having at least one electrical control terminal forming part of an electrically conductive path, the security system comprising:

a protective housing constructed to cover and isolate the at least one electrical control terminal of the vehicle subsystem, said housing being installed to cover at least the said control electrical terminal of the vehicle subsystem, the protective housing being configured to impede motion of said vehicle if tampered with;

at least one hole in the said housing enabling mounting the protective housing on to at least one pre-existing connection element of the vehicle subsystem;

a switch located within said protective housing and connected in series with said electrical control terminal, said switch operable to selectively connect the conductive path in response to receipt of an activation command signal; and a controller for sending an activation command signal to said switch thus governing the security system.

74. The security system of claim 73 wherein said mounting uses a second pre-existing connection element, the vehicular subsystem is a vehicle starting solenoid, wherein said electrical control terminal is an initiate stud of the vehicle starter solenoid and wherein the second pre-existing connection element is a threaded power terminal of the vehicle solenoid.

75. The security system of claim 73, wherein said mounting uses a second pre-existing connection element, the vehicular subsystem is a vehicle starting solenoid, wherein said electrical control terminal is an initiate stud of the vehicle starter solenoid and wherein a second pre-existing connection element is a mounting or assembly screw of the vehicle solenoid.

* * * * *